(12) United States Patent
Sakano et al.

(10) Patent No.: US 11,143,511 B2
(45) Date of Patent: Oct. 12, 2021

(54) ON-VEHICLE PROCESSING DEVICE

(71) Applicant: Clarion Co., Ltd., Saitama (JP)

(72) Inventors: Morihiko Sakano, Tokyo (JP); Takehito Ogata, Tokyo (JP); Shinya Tagawa, Saitama (JP); Masahiro Kiyohara, Saitama (JP); Yoshitaka Uchida, Saitama (JP)

(73) Assignee: Clarion Co., Ltd, Saitama (JP)

( * ) Notice: Subject to any disclaimer, the term of this patent is extended or adjusted under 35 U.S.C. 154(b) by 318 days.

(21) Appl. No.: 16/338,718

(22) PCT Filed: Oct. 26, 2017

(86) PCT No.: PCT/JP2017/038645
§ 371 (c)(1),
(2) Date: Apr. 2, 2019

(87) PCT Pub. No.: WO2018/131258
PCT Pub. Date: Jul. 19, 2018

(65) Prior Publication Data
US 2020/0292320 A1 Sep. 17, 2020

(30) Foreign Application Priority Data

Jan. 13, 2017 (JP) .............................. JP2017-004110

(51) Int. Cl.
*G01C 21/28* (2006.01)
*G01S 19/48* (2010.01)
*G05D 1/02* (2020.01)

(52) U.S. Cl.
CPC ............ *G01C 21/28* (2013.01); *G01S 19/485* (2020.05); *G05D 1/0246* (2013.01); *G05D 2201/0213* (2013.01)

(58) Field of Classification Search
CPC ....... G06F 40/151; G01C 21/28; G01C 21/30; G01C 21/00; G06K 9/00; G06T 2207/00; B60K 2370/00
See application file for complete search history.

(56) References Cited

U.S. PATENT DOCUMENTS

2007/0027597 A1 2/2007 Breuel et al.
2009/0228204 A1* 9/2009 Zavoli ..................... G01S 19/49
701/532

FOREIGN PATENT DOCUMENTS

DE 102004027983 A1 * 4/2005 ......... B60K 31/0008
JP 2005-265494 A 9/2005
(Continued)

OTHER PUBLICATIONS

Partial Supplementary European Search Report issued in European Application No. 17890879.4 dated Oct. 23, 2020 (12 pages).
(Continued)

*Primary Examiner* — Thomas G Black
*Assistant Examiner* — Ana D Thomas
(74) *Attorney, Agent, or Firm* — Crowell & Moring LLP

(57) ABSTRACT

Provided is an on-vehicle processing device that can estimate the position of a vehicle with higher accuracy. A storage unit stores a parking lot point group including a plurality of coordinates of points of a part of an object in a parking lot coordinate system. A sensor input unit acquires peripheral information from a camera. A movement information acquisition unit acquires movement information. A local peripheral information creation unit generates local peripheral information expressing second point group data including a position of the vehicle in a local coordinate system and a plurality of coordinates of points of a part of the object in the local coordinate system on the basis of the peripheral information and the movement information. A position estimation unit estimates a correlation between the (Continued)

parking lot coordinate system and the local coordinate system on the basis of the parking lot point group and the local peripheral information, and estimates the position of the vehicle in the parking lot coordinate system from the position of the vehicle in the local coordinate system and the correlation.

10 Claims, 22 Drawing Sheets

(56) References Cited

FOREIGN PATENT DOCUMENTS

| JP | 2005265494 A | * | 9/2005 | ............... B60R 1/00 |
| --- | --- | --- | --- | --- |
| JP | 2006-72431 A | | 3/2006 | |
| JP | 2007-183432 A | | 7/2007 | |
| JP | 2007183432 A | * | 7/2007 | ............. G09B 29/00 |
| JP | 2007-534041 A | | 11/2007 | |
| JP | 2007534041 A | * | 11/2007 | ......... B60K 31/0008 |
| JP | 2010-70012 A | | 4/2010 | |
| WO | WO 2009/098154 A1 | | 8/2009 | |
| WO | WO-2009098154 A1 | * | 8/2009 | ............. G01S 19/49 |

OTHER PUBLICATIONS

International Search Report (PCT/ISA/210) issued in PCT Application No. PCT/JP2017/038645 dated Jan. 30, 2018 with English translation (five pages).

Japanese-language Written Opinion (PCT/ISA/237) issued in PCT Application No. PCT/JP2017/038645 dated Jan. 30, 2018 (five pages).

Extended European Search Report issued in European Application No. 17890879.4 dated Feb. 1, 2021 (11 pages).

* cited by examiner

| PARKING LOT 1 | LATITUDE: xxx, LONGITUDE: xxx | | | |
| --- | --- | --- | --- | --- |
| | NAME | | X-COORDINATE | Y-COORDINATE |
| | PARKING AREA | APEX 1 | | |
| | | APEX 2 | | |
| | | APEX 3 | | |
| | | APEX 4 | | |
| | LANDMARK | 1 | | |
| | | 2 | | |
| | | 3 | | |
| | | . | | |
| | | . | | |
| PARKING LOT 2 | LATITUDE: xxx, LONGITUDE: xxx | | | |
| | NAME | | X-COORDINATE | Y-COORDINATE |
| | PARKING AREA | APEX 1 | | |
| | | APEX 2 | | |
| | | APEX 3 | | |
| | | APEX 4 | | |
| | LANDMARK | 1 | | |
| | | 2 | | |
| | | 3 | | |
| | | . | | |
| | | . | | |

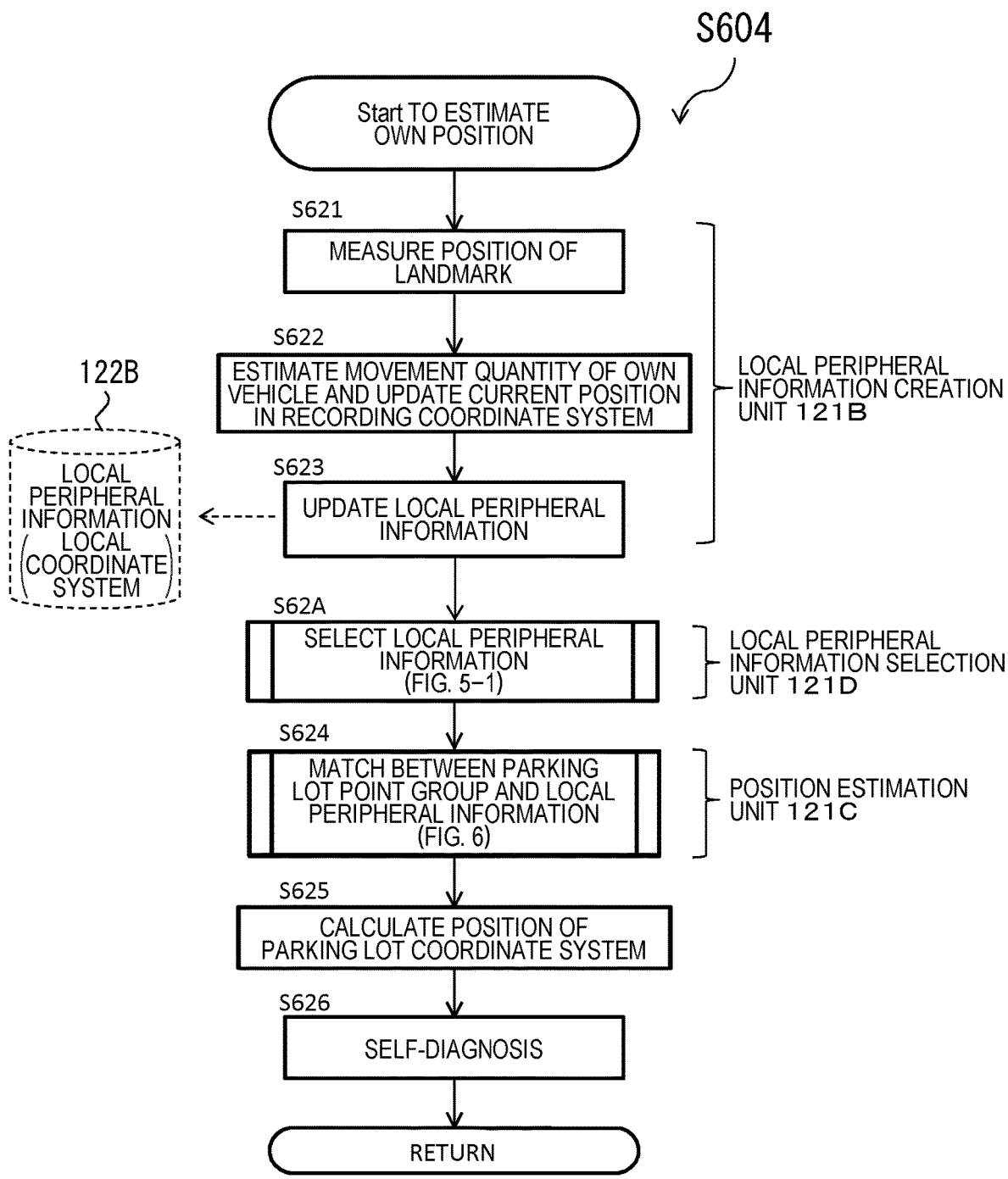

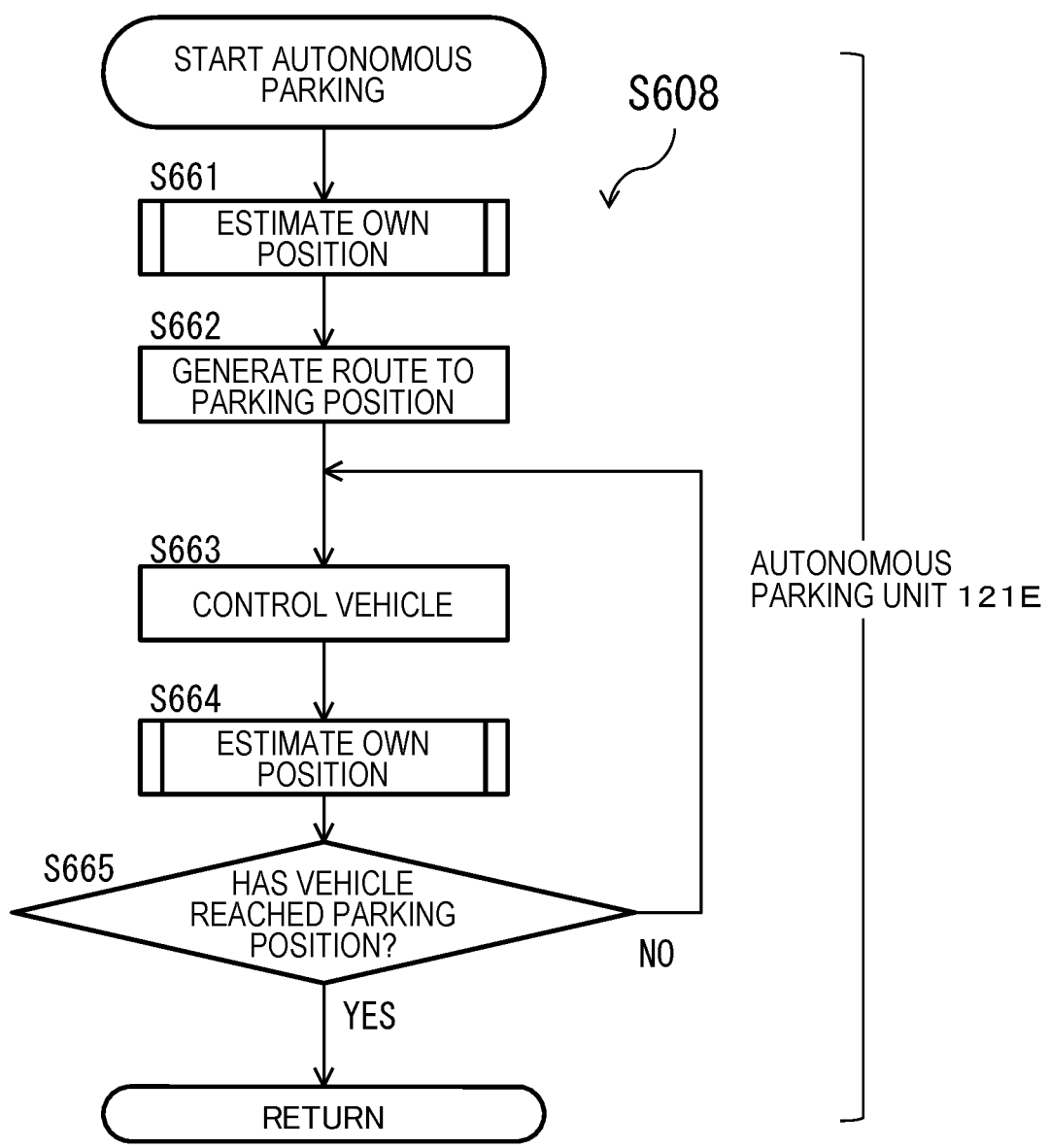

-------- LOCAL PERIPHERAL INFORMATION

— PARKING LOT POINT GROUP
○ ○ ○ LOCAL PERIPHERAL INFORMATION

COORDINATE TRANSFORMATION

ON-VEHICLE PROCESSING DEVICE

TECHNICAL FIELD

The present invention relates to an on-vehicle processing device.

BACKGROUND ART

In recent years, activities to realize automated driving of automobiles have been extensively carried out. Automated driving refers to autonomous travel of a vehicle without a user's operation. In this automated driving, the periphery of the vehicle is sensed by use of an external sensor such as a camera, an ultrasonic radar, or a radar, and based on the sensing result, determination is performed. This automated driving requires estimation of the position of the vehicle.

PTL 1 discloses an automated travel device including a position detecting means of measuring a position of a vehicle, an imaging means of photographing a periphery of the vehicle and generating image data, a position calculating means of setting a search range of a road structure in the image data on the basis of a position error of the road structure and processing in the search range so as to calculate a position of the road structure, an own-vehicle position correcting means of correcting the vehicle position measured by the position detecting means on the basis of the position of the road structure that is calculated by the position calculating means, and a control instruction outputting means of outputting a control instruction for automated travel on the basis of the corrected vehicle position.

CITATION LIST

Patent Literature

PTL 1: JP 2007-183432 A

SUMMARY OF INVENTION

Technical Problem

Although PTL 1 does not describe the disturbance, various disturbances generally occur in outdoor environments, and therefore the position estimation that resists against the disturbance has been demanded. In addition, because of various reasons, the accuracy of estimating the position of the vehicle may become low.

An object of the present invention is to provide an on-vehicle processing device that can estimate the position of the vehicle with higher accuracy.

Solution to Problem

In order to achieve the above object, an on-vehicle processing device according to the present invention includes: a storage unit that stores first point group data including a plurality of coordinates of points of a part of an object in a first coordinate system; a sensor input unit that acquires from a sensor that detects peripheral information expressing an image of the object around a vehicle or a distance to the object, the peripheral information; a movement information acquisition unit that acquires movement information expressing a movement quantity and a movement direction of the vehicle; a local peripheral information creation unit that generates local peripheral information expressing second point group data including a position of the vehicle in a second coordinate system and a plurality of coordinates of points of a part of the object in the second coordinate system on the basis of the peripheral information and the movement information; and a position estimation unit that estimates a correlation between the first coordinate system and the second coordinate system on the basis of the first point group data and the local peripheral information, and estimates the position of the vehicle in the first coordinate system from the position of the vehicle in the second coordinate system and the correlation.

Advantageous Effects of Invention

According to the present invention, the position of the vehicle can be estimated with higher accuracy. A problem, a structure, and an effect other than those described above will be made apparent from the following description of an embodiment.

BRIEF DESCRIPTION OF DRAWINGS

FIG. 2 is a diagram illustrating one example of a parking lot point group.

FIG. 5A is a flowchart showing an own position estimating process in the autonomous parking phase.

FIG. 7 is a flowchart showing an autonomous parking process in the autonomous parking phase.

DESCRIPTION OF EMBODIMENTS

A structure and an operation of on-vehicle processing devices according to first to third embodiments of the present invention are hereinafter described with reference to the drawings. Throughout the drawings, the same component is denoted by the same reference sign.

First Embodiment

An on-vehicle processing device according to a first embodiment of the present invention is hereinafter described with reference to FIG. 1 to FIG. 13C.

Figure 1:
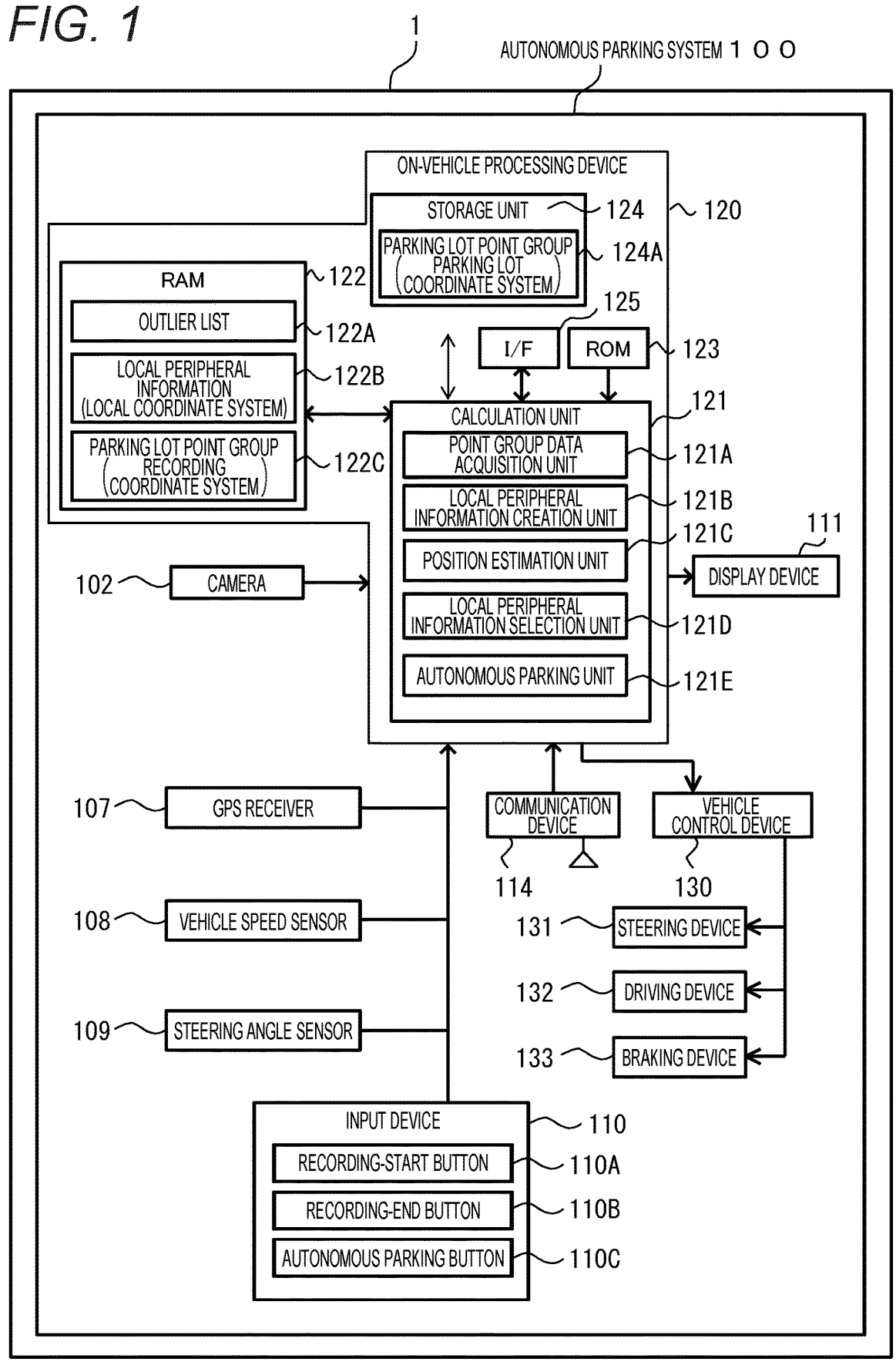
FIG. 1 is a structure diagram illustrating an autonomous parking system including an on-vehicle processing device according to a first embodiment of the present invention.

FIG. 1 is a structure diagram of an autonomous parking system 100 including an on-vehicle processing device 120 according to the first embodiment of the present invention. The autonomous parking system 100 is mounted in a vehicle 1. The autonomous parking system 100 includes a sensor group (102, 107 to 109), an input/output device group (110, 111, 114), a control device group that controls the vehicle 1 (130 to 133), and the on-vehicle processing device 120. The sensor group, the input/output device group, and the control device group are connected to the on-vehicle processing device 120 with signal lines, and exchange various pieces of data with the on-vehicle processing device 120.

The on-vehicle processing device 120 includes a calculation unit 121, a RAM 122, a ROM 123, a storage unit 124, and an interface 125 (I/F). The calculation unit 121 is, for example, a CPU (Central Processing Unit). An arithmetic process may be partially or entirely executed in another arithmetic processing device such as an FPGA (Field Programmable Gate Array). The RAM 122 (Random Access Memory) is a storage area where reading and writing are possible, and operates as a main storage device of the on-vehicle processing device 120. The RAM 122 stores an outlier list 122A to be described below, local peripheral information 122B to be described below, and a parking lot point group 122C. The ROM 123 (Read Only Memory) is a read-only storage area, and stores a program to be described below. The program is developed in the RAM 122 and executed by the calculation unit 121. The calculation unit 121 reads in the program and executes the program, so that the calculation unit 121 operates as a point group data acquisition unit 121A, a local peripheral information creation unit 121B, a position estimation unit 121C, a local peripheral information selection unit 121D, and an autonomous parking unit 121E.

The storage unit 124 is a nonvolatile storage device and operates as an auxiliary storage device of the on-vehicle processing device 120. The storage unit 124 stores the parking lot point group 124A. The parking lot point group 124A is one or a plurality of pieces of parking lot data. The parking lot data are positional information of a certain parking lot (for example, latitude and longitude, coordinate showing a parking lot area), and an aggregation of coordinates of a landmark (for example, parking frame line) existing in the parking lot. The landmark will be described in detail below. The interface 125 is used to exchange information between the on-vehicle processing device 120 and another device included in the autonomous parking system 100.

The sensor group includes a camera 102 that photographs the periphery of the vehicle 1, a GPS receiver 107, a vehicle speed sensor 108, and a steering angle sensor 109.

The camera 102 outputs an image obtained by photographing (hereinafter, photographed image) to the on-vehicle processing device 120. The on-vehicle processing device 120 measures the position of the landmark (for example, parking frame line), which is described below, by the use of the photographed image of the camera 102. Internal parameters such as the focal length and the size of the imaging element of the camera 102, and external parameters such as the position and posture of attaching the camera 102 to the vehicle 1 are known and saved in advance in the ROM 123. The on-vehicle processing device 120 can calculate the positional relation between the subject and the camera 102 by using the internal parameters and the external parameters stored in the ROM 123.

The GPS receiver 107 receives signals from a plurality of satellites in a satellite navigation system, and calculates the position of the GPS receiver 107 (for example, latitude and longitude) through the calculation based on the received signals. Note that the latitude and longitude calculated by the GPS receiver 107 does not need to be highly accurate and allows an error of about several meters to 10 meters, for example. The GPS receiver 107 outputs the calculated latitude and longitude to the on-vehicle processing device 120.

The vehicle speed sensor 108 and the steering angle sensor 109 measure the vehicle speed and the steering angle of the vehicle 1, respectively and output the results to the on-vehicle processing device 120. The on-vehicle processing device 120 calculates the movement quantity and the movement direction of the vehicle 1 in accordance with the known dead reckoning technique by the use of the output from the vehicle speed sensor 108 and the steering angle sensor 109.

The input device 110 includes a recording-start button 110A, a recording-end button 110B, and an autonomous parking button 110C. When any of these buttons is pressed, a user's operation instruction to the on-vehicle processing device 120 is input to the input device 110. A display device 111 is a liquid crystal display, for example, and displays information output from the on-vehicle processing device 120. Note that the input device 110 and the display device 111 may be integrated to form a liquid crystal display device capable of a touch operation. In this case, when a predetermined area in the liquid crystal display is touched, it may be determined that the recording-start button 110A, the recording-end button 110B, or the autonomous parking button 110C is pressed.

The communication device 114 is used to exchange information wirelessly between the on-vehicle processing device 120 and a device outside the vehicle 1. For example, when the user is outside the vehicle 1, the communication device 114 communicates with a mobile terminal carried by the user and exchanges information therewith. The object with which the communication device 114 communicates is not limited to the mobile terminal of the user.

A vehicle control device 130 controls a steering device 131, a driving device 132, and a braking device 133 on the basis of the operation instructions from the on-vehicle processing device 120. The steering device 131 controls the steering of the vehicle 1. The driving device 132 applies a driving force to the vehicle 1. The driving device 132, for example, increases the target engine speed of the vehicle 1, so that the driving force of the vehicle 1 is increased. The braking device 133 applies a braking force to the vehicle 1.

(Measurement of Position of Landmark)

The landmark is an object with a characteristic that can be identified by a sensor, and is, for example, a parking frame line corresponding to one kind of paint on a road surface, an obstacle that interrupts the travel of the vehicle, a wall of a building, or the like. In the present embodiment, a vehicle or a person corresponding to a mobile body is not included in the landmark. The on-vehicle processing device 120 detects the landmark existing around the vehicle 1, that is, the point with the characteristic that can be identified by the sensor on the basis of the information input from the camera 102. The detection of the landmark based on the information input from the external sensor, that is, the camera 102 is hereinafter referred to as "landmark position measurement".

(Detection of Paint on Road Surface)

The on-vehicle processing device 120 detects the paint on the road surface or the like, for example the parking frame line, by executing an image recognition program as below for the photographed image of the camera 102. In the detection of the parking frame, the on-vehicle processing device 120 first extracts the edge through a Sobel filter or the like from the input image. Next, the on-vehicle processing device 120 extracts a pair of rise of the edge where white changes to black and a fall of the edge where black changes to white, for example. If the distance between this pair substantially coincides with a first predetermined distance, that is, the thickness of a white line of the parking frame, the on-vehicle processing device 120 uses this pair as a candidate of the parking frame. Through the similar process, a plurality of candidates of the parking frame is detected; then, if the distance between the candidates of the parking frame substantially coincides with a second predetermined distance, that is, the interval of the white lines of the parking frame, these are detected as the parking frame. The paint on the road surface except the parking frame is detected by the on-vehicle processing device 120 that executes the following process (image recognition program). First, the edge is extracted from the input image through a Sobel filter or the like. By searching for the pixels with the edge intensity higher than a predetermined certain value and the edges separated at a predetermined distance corresponding to the width of a white line, the detection is possible.

(Exclusion of Mobile Body)

The on-vehicle processing device 120 detects the mobile body such as the vehicle or the person through known template matching, for example, and excludes the mobile body from the measurement result. Alternatively, the detected mobile body may be excluded from the measurement result as below. That is to say, the on-vehicle processing device 120 calculates the positional relation between the camera 102 and the subject in the photographed image using the internal parameters and the external parameters. Next, the on-vehicle processing device 120 calculates the relative speed between the vehicle 1 and the subject by tracking the subject in the photographed images acquired successively by the camera 102. Finally, the on-vehicle processing device 120 calculates the speed of the vehicle 1 using the output from the vehicle speed sensor 108 and the steering angle sensor 109, and if the speed of the vehicle 1 does not coincide with the speed relative to the subject, the subject is determined to be the mobile body and the information regarding this mobile body is excluded from the measurement result.

(Parking Lot Point Group 124A)

FIG. 2 illustrates one example of the parking lot point group 124A stored in the storage unit 124. FIG. 2 shows the example in which two pieces of parking lot data are stored as the parking lot point group 124A. One piece of parking lot data includes the position of the parking lot (for example, latitude and longitude), the coordinate of a parking area to be described below, and the coordinate of the point of the landmark on a two-dimensional plane. The position of the parking lot is the latitude and the longitude of an entrance of the parking lot and its vicinity, a central position of the parking lot and its vicinity, or the parking position. The coordinate of the parking area and the coordinate of the point of the landmark are the coordinates in the coordinate system unique to the parking lot data. The coordinate system in the parking lot data is hereinafter referred to as "parking lot coordinate system". In the parking lot coordinate system, for example, the coordinate of the vehicle 1 when the recording is started is the origin, and the direction where the vehicle 1 travels at the start of the recording is expressed by a Y axis, and a right direction of the vehicle 1 at the start of the recording is an X axis. In other words, the parking lot coordinate system (first coordinate system) is set based on the position and posture of the vehicle 1 when the recording of the parking lot point group 124A (first point group data) is started. Regarding the coordinate of the parking area, if the parking area is rectangular, the coordinates of the four apexes of the rectangular area are recorded. However, the parking area is not limited to a rectangular shape and may be other polygonal shape or an elliptical shape.

(Outlier List 122A)

The outlier list 122A stores information regarding the points of the local peripheral information 122B which is regarded as an object that is not processed by the on-vehicle processing device 120. The outlier list 122A is updated by the on-vehicle processing device 120 as will be described below.

(Local Peripheral Information 122B)

The local peripheral information 122B stores the coordinate of the point of the landmark that the on-vehicle processing device 120 has detected in the autonomous parking phase, which is described below. This coordinate is in the coordinate system in which, based on the position and posture of the vehicle 1 when the recording of the local peripheral information 122B is started, that position is used as the origin, for example, the travel direction of the vehicle 1 is the Y axis and the right direction in the travel direction is the X axis. This coordinate system is hereinafter referred to as "local coordinate system". In other words, the local coordinate system (second coordinate system) is set based on the position and posture of the vehicle 1 when the recording of the local peripheral information 122B is started.

(Summary of Operation of On-Vehicle Processing Device 120)

The on-vehicle processing device 120 mainly includes two operation phases: a recording phase and an autonomous parking phase. The on-vehicle processing device 120 operates in the autonomous parking phase in accordance with a particular instruction from a user (pressing of autonomous parking button 110C). On the other hand, the recording phase is started in accordance with an instruction from the user (pressing of recording-start button 110A).

In the recording phase, the user drives the vehicle 1 and the on-vehicle processing device 120 collects the parking lot data, that is, the information of the white lines and obstacles in the parking lot and the information of the parking position on the basis of the information from the sensors included in the vehicle 1. The on-vehicle processing device 120 stores the collected information in the storage unit 124 as the parking lot point group 124A.

In the autonomous parking phase, the vehicle 1 is controlled by the on-vehicle processing device 120, and based on the parking lot point group 124A stored in the storage unit 124 and the information from the sensors in the vehicle 1, the vehicle 1 is parked at a predetermined parking position. The on-vehicle processing device 120 estimates the current position by detecting the white line and the obstacle around the vehicle 1 on the basis of the information from the sensors and comparing with the parking lot point group 124A. That is to say, the on-vehicle processing device 120 estimates the current position of the vehicle 1 in the parking lot coordinate system without using the information obtained from the GPS receiver 107. The recording phase and the autonomous parking phase will be described below in detail.

(Recording Phase)

The user presses the recording-start button 110A near the entrance of the parking lot, and has the on-vehicle processing device 120 start the operation in the recording phase. Then, the user drives the vehicle 1 by himself to the parking position and after stopping the vehicle, presses the recording-end button 110B to have the on-vehicle processing device 120 end the operation in the recording phase.

The on-vehicle processing device 120 starts the operation in the recording phase when the user has pressed the recording-start button 110A, and ends the operation in the recording phase when the user has pressed the recording-end button 110B. The operation in the recording phase by the on-vehicle processing device 120 is divided into two: extracting the point group of the landmark and recording the extracted point group.

A process of extracting the point group by the on-vehicle processing device 120 is described. When the user has pressed the recording-start button 110A, the on-vehicle processing device 120 secures a temporary recording area in the RAM 122. Then, the on-vehicle processing device 120 repeats the following process until the recording-end button 110B is pressed. That is to say, the on-vehicle processing device 120 extracts the point group of the landmark on the basis of the photographed image of the camera 102. In addition, the on-vehicle processing device 120 calculates the movement quantity and the movement direction where the vehicle 1 has moved after the camera 102 photographed previously and before the camera 102 photographs this time on the basis of the output from the vehicle speed sensor 108 and the steering angle sensor 109. Then, the on-vehicle processing device 120 records the positional relation with the vehicle 1, and the point group extracted based on the movement quantity and the movement direction of the vehicle 1 in the RAM 122. The on-vehicle processing device 120 repeats this process.

The position of the vehicle 1 and the coordinate of the point group are recorded as the coordinate value in the recording coordinate system. In "the recording coordinate system" that is handled as the coordinate value in the coordinate system, the position of the vehicle 1 when the recording is started is used as the origin (0, 0), and the travel direction (posture) of the vehicle 1 when the recording is started is the Y axis and the right direction of the vehicle 1 when the recording is started is the X axis. Therefore, even though the point group is recorded in the same parking lot, the recording coordinate system that is set is different depending on the position and the posture of the vehicle 1 when the recording is started. Accordingly, the point group of the landmark is recorded in the different coordinate.

The user parks the vehicle at the target parking position and operates the recording-end button 110B. When the recording-end button 110B is pressed, the on-vehicle processing device 120 records the current position, which is regarded as the parking position, in the RAM 122 as the parking lot point group 122C. The parking position is recorded as the coordinates at the four corners when the vehicle 1 is approximated to the rectangle. In addition, the on-vehicle processing device 120 additionally records the latitude and the longitude output from the GPS receiver 107 as the coordinate of the parking lot. Note that the parking lot point group 122C has the data structure similar to that of the point group of one parking lot included in the parking lot point group 124A shown in FIG. 2. Next, the on-vehicle processing device 120 performs a process of recording the point group in the following manner. However, the latitude and the longitude that are output from the GPS receiver 107 when the recording-start button 110A is pressed may be recorded as the coordinate of the parking lot.

The on-vehicle processing device 120 determines whether the coordinate of the parking lot that is recorded by the operation of the recording-end button 110B, that is, the latitude and the longitude substantially coincide with the coordinate of any one of the parking lots that are already recorded in the parking lot point group 124A. If the both do not substantially coincide, the on-vehicle processing device 120 records the parking lot point group 122C, which is saved in the RAM 122, in the parking lot point group 124A as a new piece of parking lot data. If the both substantially coincide, the on-vehicle processing device 120 determines whether to merge the parking lot point group 122C with which the coordinate of the parking lot substantially coincides, as one parking lot point group (parking lot point group 124A). For this determination, the on-vehicle processing device 120 first performs the coordinate transformation so that the parking position included in the parking lot data and the parking position recorded in the RAM coincide, and then calculates the point group coincidence corresponding to the coincidence between the point group of the parking lot point group 124A and the point group saved in the RAM 122. Then, the on-vehicle processing device 120 determines that the both are merged if the calculated point group coincidence is more than a threshold and determines that the both are not merged if the calculated point group coincidence is less than or equal to the threshold. How to calculate the point group coincidence will be described below.

If it is determined that the both are not merged, the on-vehicle processing device 120 records the parking lot point group 122C saved in the RAM 122, in the parking lot point group 124A as a new piece of parking lot data. If it is determined that the both are merged, the on-vehicle processing device 120 adds the parking lot point group 122C saved in the RAM 122 to the existing parking lot data in the parking lot point group 124A.

(Flowchart of Recording Phase)

Figure 3:
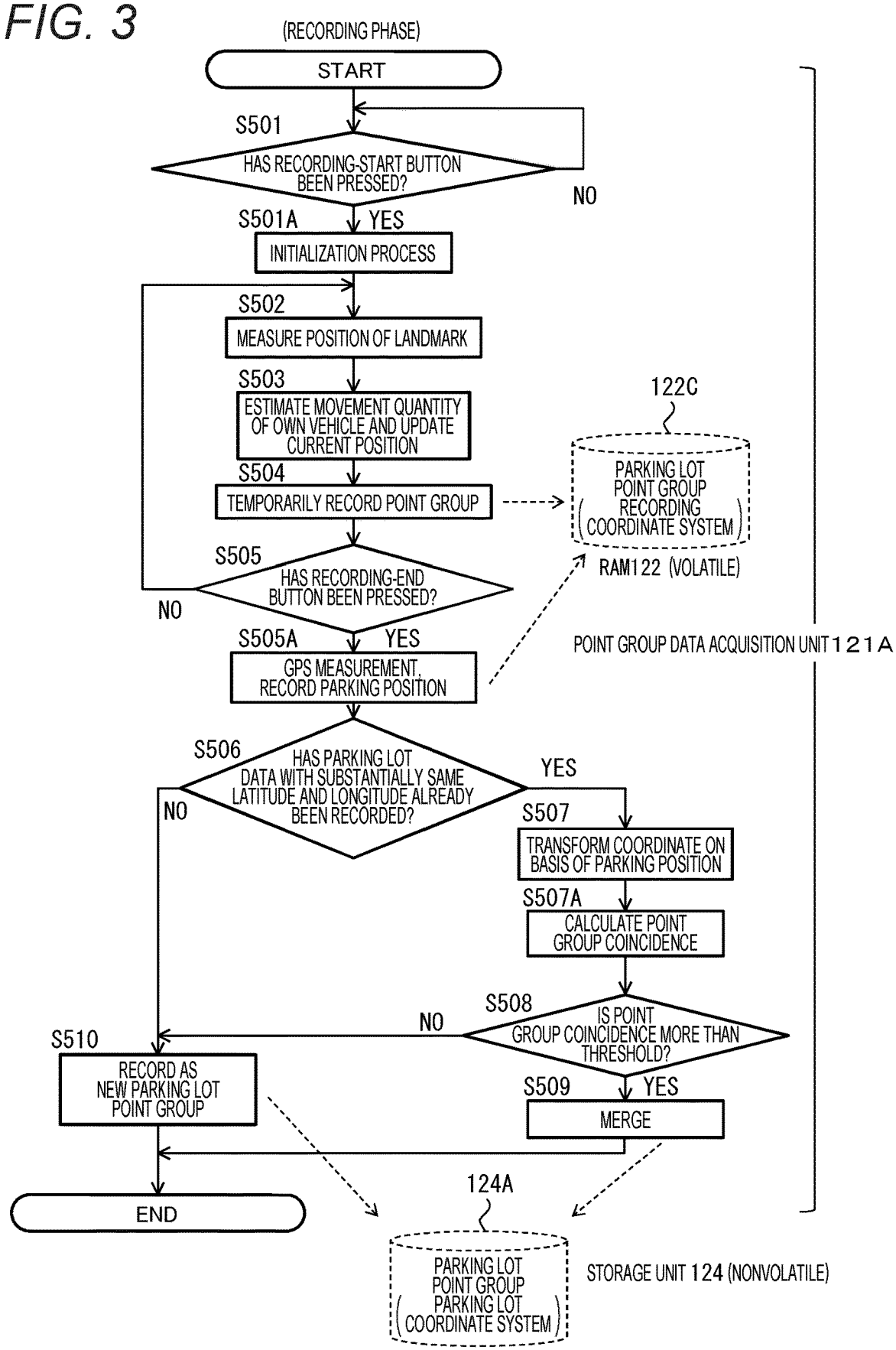
FIG. 3 is a flowchart showing an operation in a recording phase of the on-vehicle processing device according to the first embodiment of the present invention.

FIG. 3 is a flowchart of the operation in the recording phase of the on-vehicle processing device 120. A subject that executes each step in the following description is the calculation unit 121 in the on-vehicle processing device 120. The calculation unit 121 functions as the point group data acquisition unit 121A in the case of performing the process in FIG. 3.

In step S501, whether the recording-start button 110A has been pressed is determined. If it is determined that the recording-start button 110A has been pressed, the process advances to step S501A; if it is determined that the recording-start button 110A has not been pressed, the process remains in step S501. In step S501A, a new recording area is secured in the RAM 122 (initialization process). In this storage area, the extracted point group and the current position of the vehicle 1 are recorded using the coordinates of the recording coordinate system as described above.

In step S502, the information is acquired from the sensor group so that the position of the landmark is measured. For example, the point group of the landmark is extracted using the photographed image of the camera 102. In step S503, subsequently, the movement quantity of the vehicle 1 after the previous photographing of the camera 102 and before the latest photographing is estimated and the current position of the vehicle 1 in the recording coordinate system that is recorded in the RAM 122 is updated. The movement quantity of the vehicle 1 can be estimated by a plurality of means (devices/circuits), and for example, the movement quantity of the vehicle 1 can be estimated from the change in position of the subject that exists on the road surface in the photographed image of the camera 102 as described above. In addition, in the case where a GPS receiver that is highly precise and allows a smaller error is used as the GPS receiver 107, the output thereof may be used. Next, the process advances to step S504.

In step S504, the point group extracted in step S502 is saved in the RAM 122 as the coordinate in the recording coordinate system on the basis of the current position that is updated in step S503. In the subsequent step S505, whether the recording-end button 110B has been pressed is determined. If it is determined that the recording-end button 110B has been pressed, the process advances to step S505A; if it is determined that the recording-end button 110B has not been pressed, the process returns to step S502. In step S505A, the current latitude and longitude of the vehicle 1 are acquired from the GPS receiver 107 and moreover, the parking position, that is, the current position of the vehicle 1 or the coordinates in the recording coordinate system at the four corners of the vehicle 1 are recorded. Next, the process advances to step S506.

In step S506, whether the parking lot data including the latitude and the longitude that substantially coincide with the current latitude and longitude of the vehicle 1 that are acquired in step S505A are recorded in the parking lot point group 124A is determined. If the current latitude and longitude of the vehicle 1 substantially coincide with the latitude and longitude of any piece of the parking lot data recorded in the parking lot point group 124A, the process advances to step S507, and in the other cases, the process advances to step S510. The parking lot data of the parking lot point group 124A the latitude and the longitude of which are determined to substantially coincide with the current latitude and longitude of the vehicle 1 are hereinafter referred to as target parking lot data.

In step S507, the recording coordinate system, which is the coordinate system of the point group data saved in the RAM 122, is transformed into the coordinate system of the point group data of the target parking lot data using the parking position as the reference. That is to say, a coordinate transformation formula for the recording coordinate system and the parking lot coordinate system is derived so that the parking position included in the target parking lot data and the parking position recorded in step S505A coincide. With the use of this coordinate transformation formula, the coordinate of the point included in the landmark saved in the RAM 122 with the recording coordinate system is transformed into the parking lot coordinate system of the target parking lot data.

In the subsequent step S507A, a point group coincidence IB between the point group data saved in the RAM 122 and the target parking lot data is calculated. The point group coincidence IB is calculated by the following formula 1.

$$IB = 2*Din/(D1+D2) \qquad \text{Formula 1}$$

In the formula 1, "Din" is the number of points for which the distance between each point of the point group data subjected to the coordinate transformation in step S507 and each point of the point group data of the target parking lot data is within a predetermined distance. In the formula 1, "D1" represents the number of points in the point group data saved in the RAM 122 and "D2" represents the number of points in the point group data in the target parking lot data. Next, the process advances to step S508.

In step S508, whether the point group coincidence calculated in step S507A is more than a predetermined threshold is determined. If it is determined that the point group coincidence is more than the threshold, the process advances to step S509, and if it is determined that the point group coincidence is less than or equal to the threshold, the process advances to step S510.

In step S509, a merging process is performed, that is, the point group data subjected to the coordinate transformation in step S507 are added to the target parking lot data of the parking lot point group 124A stored in the storage unit 124. In step S510 that is executed if the determination in step S506 or step S508 is negative (NO), the point group data saved in the RAM 122, the latitude and the longitude of the vehicle 1 that are recorded in step S505A, and the parking position are recorded in the parking lot point group 124A as a new piece of the parking lot data. Thus, the flowchart in FIG. 3 ends.

(Autonomous Parking Phase)

When the user has driven the vehicle 1 to the vicinity of any of the parking lots that are recorded in the parking lot point group 124A, the display device 111 displays that the autonomous parking is possible. When the user presses the autonomous parking button 110C here, the on-vehicle processing device 120 starts the autonomous parking process. The operation of the on-vehicle processing device 120 is described below with reference to the flowchart.

(Overall Flow of Autonomous Parking Process)

Figure 4:
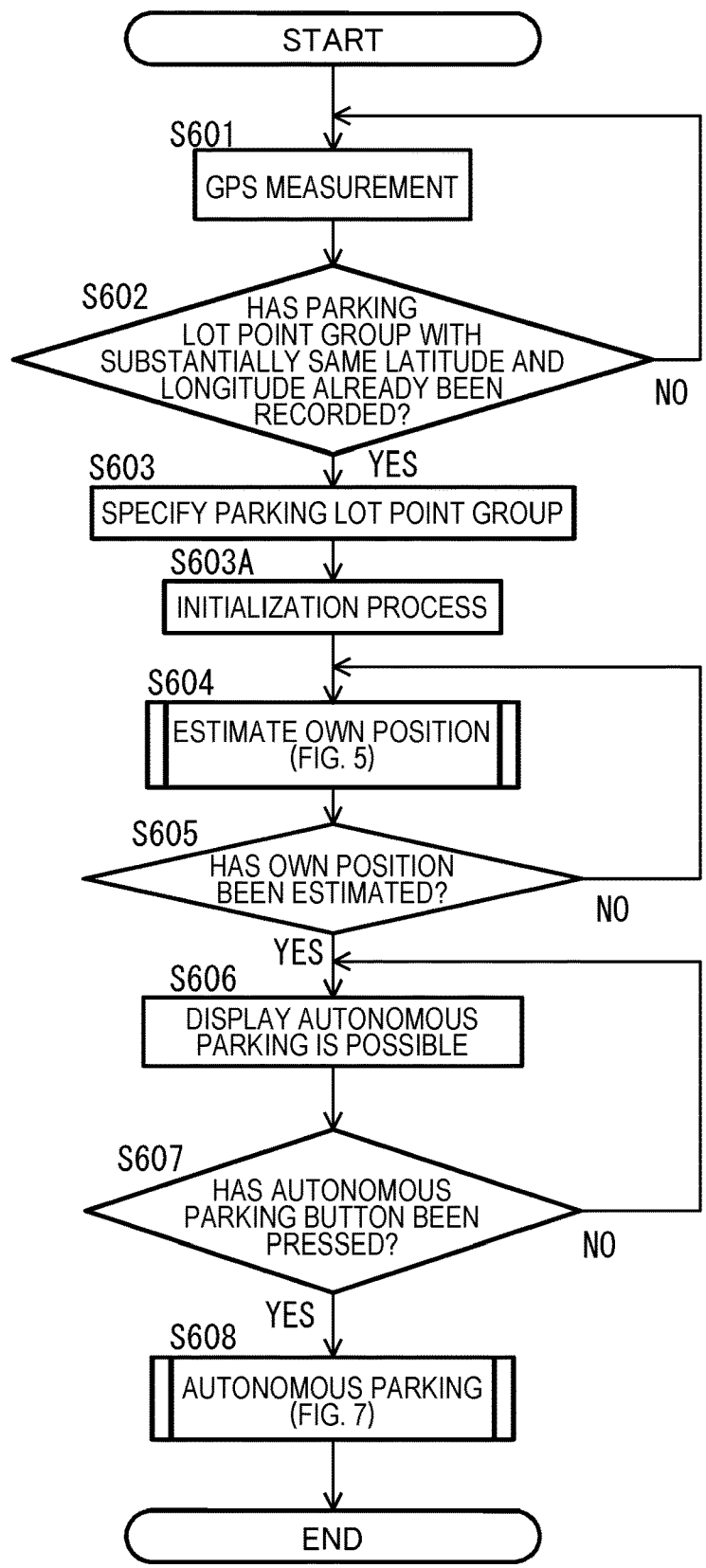
FIG. 4 is a flowchart showing an overall operation in an autonomous parking phase of the on-vehicle processing device according to the first embodiment of the present invention.

FIG. 4 is a flowchart of the entire operation in the autonomous parking phase of the on-vehicle processing device 120. A subject that executes each step in the following description is the calculation unit 121 of the on-vehicle processing device 120.

The on-vehicle processing device 120 measures the current latitude and longitude using the GPS receiver 107 (step S601) and determines whether the latitude and the longitude substantially coincide with the latitude and the longitude of any piece of the parking lot data in the parking lot point group 124A (step S602). In other words, whether there is a parking lot within a predetermined distance from the position of the vehicle 1 is determined. If it is determined that the latitude and the longitude of the vehicle 1 substantially coincide with the latitude and the longitude of any piece of the parking lot data, the process advances to step S603, and if it is determined that the latitude and the longitude of the vehicle 1 do not substantially coincide with the latitude and the longitude of any piece of the parking lot data, the process returns to step S601.

The on-vehicle processing device 120 specifies the parking lot data with the latitude and the longitude that substantially coincide with the current position of the vehicle 1 among the plural pieces of parking lot data included in the parking lot point group 124A (step S603). Next, the on-vehicle processing device 120 initializes the local peripheral information 122B stored in the RAM 122 and initializes the current position of the vehicle 1 saved in the RAM 122 as the initializing process. Specifically, if the previous information is recorded, the previous information is deleted and a new coordinate system is set. In the present embodiment, this coordinate system is referred to as a local coordinate system. This local coordinate system is set based on the position and the posture of the vehicle 1 when step S603A is executed. For example, the position of the vehicle 1 when step S603A is executed is set as the origin of the local coordinate system, and the X axis and the Y axis are set in accordance with the direction when step S603A is executed. By the initialization of the current position of the vehicle 1, the current position of the vehicle 1 is set to the origin (0, 0).

Next, the own position is estimated in accordance with the procedure in FIG. 5A, that is, the position of the vehicle 1 in the parking lot coordinate system is estimated (step S604), and in step S605, whether the own position has been estimated or not is determined. If it is determined that the position has been estimated, the process advances to step S606, and if it is determined that the position has not been estimated, the process returns to step S604.

In step S606, the on-vehicle processing device 120 causes the display device 111 to display that the autonomous parking is possible and in the following step S607, whether the user has pressed the autonomous parking button 110C is determined. If it is determined that the autonomous parking button 110C has been pressed, the process advances to step S608 and the autonomous parking process is executed in accordance with the procedure shown in FIG. 7, and if it is determined that the autonomous parking button 110C has not been pressed, the process returns to step S606.

(Estimation of Own Position)

With reference to FIG. 5A, the process of estimating the own position to be executed in step S604 in FIG. 4 is described in detail. The calculation unit 121 functions as the local peripheral information creation unit 121B in the case of performing the process shown in steps S621 to S623 in FIG. 5A.

The measurement of the position of the landmark in step S621, the estimation of the movement quantity of the own vehicle in step S622, and the recording (updating) of the local peripheral information 122B in step S623 are substantially the same as those in the process in steps S502 to S504 in FIG. 3, respectively. The different point is that the data stored in the RAM 122 are recorded as the local peripheral information 122B.

Figure 5B:
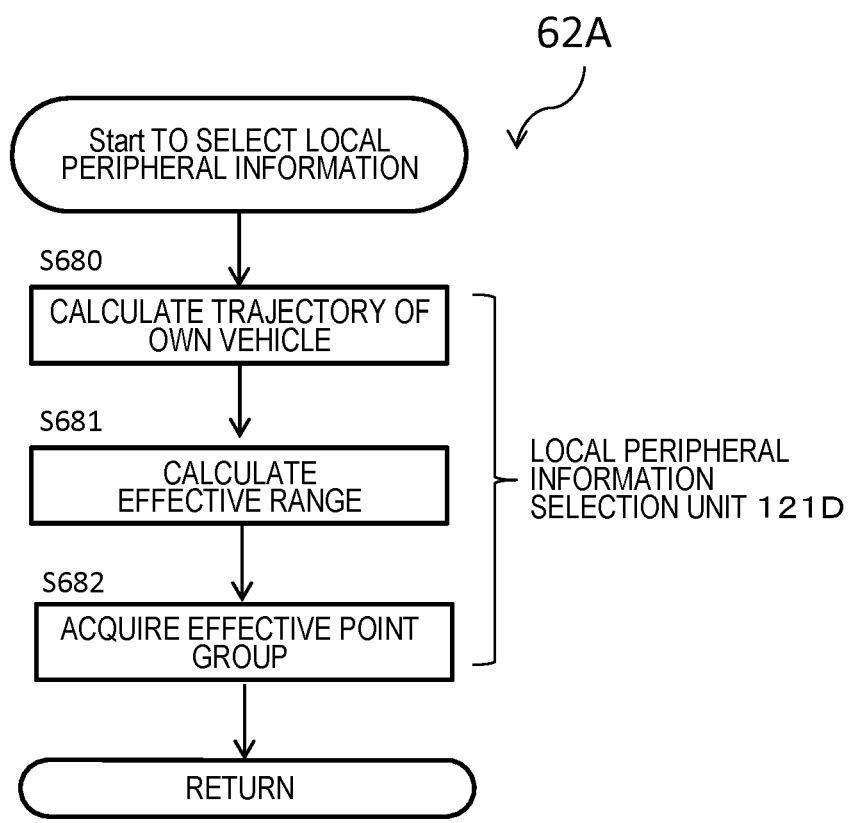
FIG. 5B is a flowchart showing a local peripheral information selecting process in the autonomous parking phase.

When the execution of step S623 ends, the on-vehicle processing device 120 selects the local peripheral information, the details of which are shown in FIG. 5B (step S62A). The process of selecting the local peripheral information is the process of selecting the point that is used in the matching process in step S624 to be described below from among the point group obtained as the local peripheral information. The point group obtained in the local peripheral information may be different from the parking lot point group in the overall shape due to the accumulated error in the estimation of the movement quantity of the own vehicle; in this case, the matching may fail. By the process of selecting the local peripheral information, the point group in the range where the error in shape is small and the matching is possible is selected adaptively.

Figure 6:
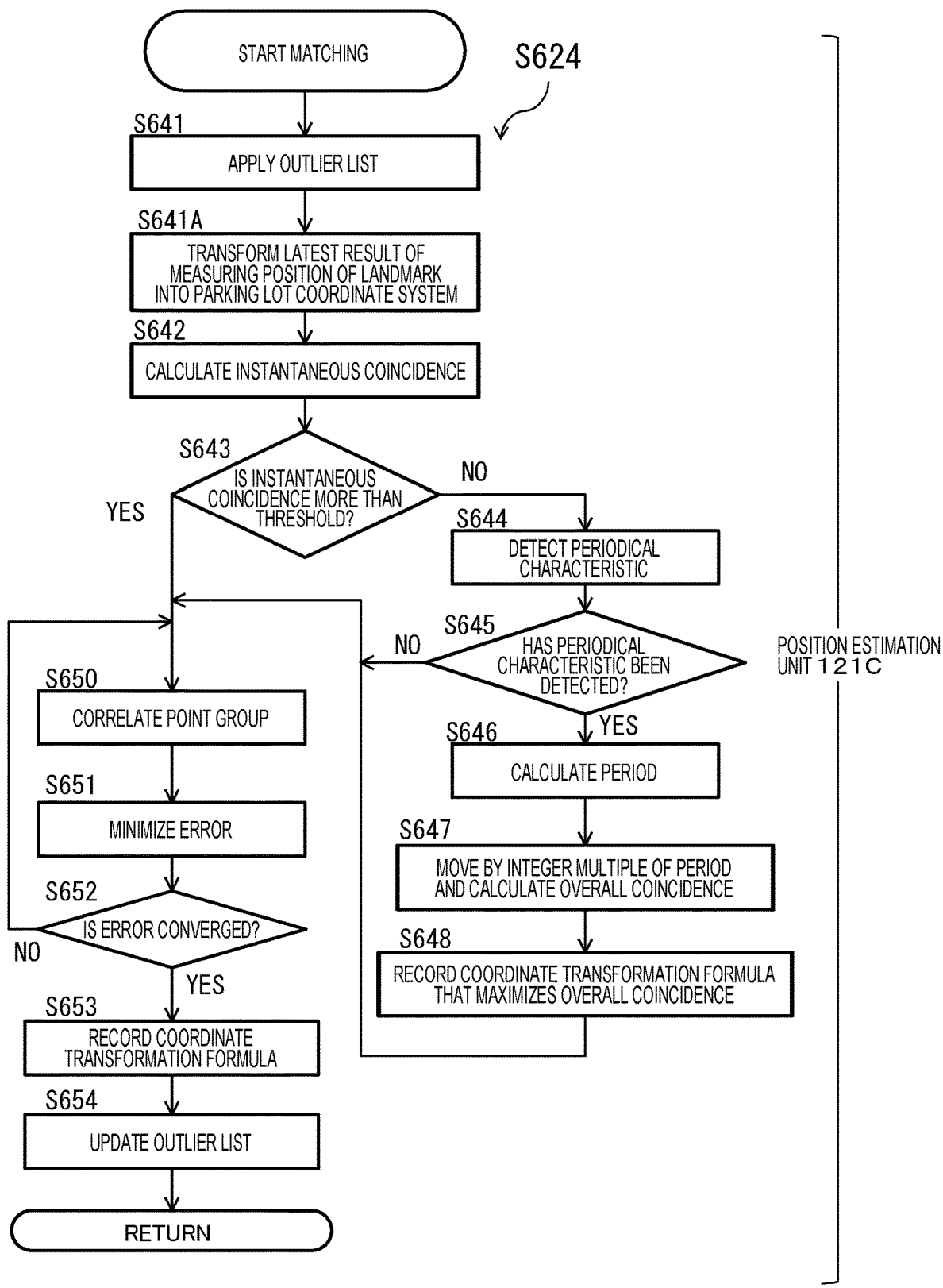
FIG. 6 is a flowchart showing a matching process in the autonomous parking phase.

When the execution of step S62A ends, the on-vehicle processing device 120 performs the matching process, the details of which are shown in FIG. 6 (step S624). In this matching process, the correlation between the parking lot coordinate system and the local coordinate system, that is, the coordinate transformation formula between the parking lot coordinate system and the local coordinate system is obtained. In the following step S625, the on-vehicle processing device 120 calculates the coordinate of the vehicle 1 in the parking lot coordinate system, that is, the own position by using the coordinate of the vehicle 1 in the local coordinate system updated in step S622 and the coordinate transformation formula obtained in step S625. Next, the process advances to step S626.

In step S626, the on-vehicle processing device 120 executes the self-diagnosis of determining the reliability of the position calculated in step S625. The self-diagnosis is performed using the following three indices, for example.

Regarding a first index, the movement quantity of the vehicle 1 that is estimated by the known dead reckoning technique using the output from the vehicle speed sensor 108 and the steering angle sensor 109 and the movement quantity in a predetermined period that is estimated by the own-position estimation are compared, and if the difference is more than a predetermined threshold, it is determined that the reliability is low.

Regarding a second index, the determination is performed using the amount of error between the corresponding points calculated in the matching. If the error is more than a predetermined threshold, it is determined that the reliability is low.

Regarding a third index, whether there is a similar solution or not is determined. If the similar solution is searched, for example the vehicle translates by the width of the parking frame from the obtained solution, and when there is a similar number of points for which the error of the corresponding point is within a certain number, it is determined that the reliability is low. If it is not determined that the reliability is low in these three indices, it is determined that the own position has been estimated.

(Selection of Local Peripheral Information)

With reference to FIG. 5B, the selection of the local peripheral information to be executed in step S62A in FIG. 5A is described in detail. The calculation unit 121 functions as the local peripheral information selection unit 121D in the case of performing the process in FIG. 5B.

In step S680, the trajectory of the own vehicle to the current position is calculated using the calculation of the movement quantity of the own vehicle that is performed inside step S622. The trajectory generated by compensating the coordinate points of the positions of the own vehicle that is calculated from the movement quantity of the own vehicle corresponds to the trajectory of the own vehicle.

In step S681, the range where the error in shape is small and the matching is possible regarding the point group of the local peripheral information is calculated. This range is determined based on the length or shape of the trajectory of the own vehicle that is calculated in step S680. The point group obtained as the local peripheral information generates more estimated errors in the movement quantity as the distance is longer and the turning amount of the vehicle is larger. On the contrary, when the point group is too small, the matching is difficult. In view of this, the point group in the range going back along the trajectory by a minimum distance D [m] that is determined in advance from the current position is acquired. Subsequently, the change quantity of the angle of a tangential line of the trajectory is accumulated and the point group around the trajectory until the angle changes by more than or equal to an angle threshold θ [deg] that is determined advance is acquired. The point group in the range of X [m]×Y [m] that is determined in advance around the trajectory is set as the effective range of the point group of the local peripheral information with respect to the trajectory. That is to say, the effective range has the shape along the trajectory that is obtained.

In step S682, the points in the effective range obtained in step S681 are acquired as the point group of the local peripheral information (effective point group).

(Matching)

With reference to FIG. 6, the matching process to be executed in step S624 in FIG. 5A is described in detail. The calculation unit 121 functions as the position estimation unit 121C in the case of performing the process in FIG. 6.

In step S641, the outlier list 122A stored in the RAM 122 is applied to the local peripheral information 122B and the point, among the point group included in the local peripheral information 122B, that is described in the outlier list 122A is to be excluded from the process object temporarily. This applies to steps S642 to S653, and in step S654, the points included in the outlier list 122A previously are also the object. However, since steps S641 to S643 are not executed when the flowchart in FIG. 6 is executed for the first time, the process is started from step S650. Next, the process advances to step S641A.

In step S641A, the coordinate of the point group detected from the latest photographed image, that is, the point group of the landmark detected in step S621 in FIG. 5A is transformed into the coordinate of the parking lot coordinate system. This transformation is achieved using the position of the vehicle 1 in the local coordinate system that is updated in step S622 and the coordinate transformation formula from the local coordinate system to the parking lot coordinate system that is calculated previously.

In the subsequent step S642, an instantaneous coincidence IC is calculated. The instantaneous coincidence IC is calculated by the following formula 2.

$$IC = DIin/DIall \quad \text{Formula 2}$$

In the formula 2, "DIin" represents the number of points, among the point group detected from the latest photographed image that is transformed into the parking lot coordinate system in step S641A, for which the distance to the point of the closest parking lot point group 124A is less than or equal to a predetermined threshold. In the formula 2, "DIall" represents the number of point groups detected in step S621. Next, the process advances to step S643.

In step S643, whether the instantaneous coincidence IC calculated in step S642 is more than the threshold is determined. If it is determined that the instantaneous coincidence IC is more than the threshold, the process advances to step S650, and if it is determined that the instantaneous coincidence IC is less than or equal to the threshold, the process advances to step S644.

In step S644, the periodic characteristic such as the parking frames that are provided side by side is detected from the parking lot data corresponding to the target of the parking lot point group 124A, that is, the point group data. As described above, the point group included in the parking lot point group is obtained by extracting the edge of the image, for example. Therefore, the parking frame line can be detected from the points that are provided at intervals corresponding to the thickness of the white line. In the following step S645, whether the periodic characteristic has been detected in step S644 is determined. If it is determined that the periodic characteristic has been detected, the process advances to step S646, and if it is determined that the periodic characteristic has not been detected, the process advances to step S650. In step S646, the period of the periodic characteristic (characteristic quantity to be the unit of the repetition), such as the width of the parking frame, is calculated. The width of the parking frame described here is the distance between the white lines of the parking frame. Next, the process advances to step S647.

In step S647, based on the coordinate transformation formula that is calculated in the previous step S653, this coordinate transformation formula is varied in a plurality of ways, and each overall coincidence IW is calculated. The coordinate transformation formula is varied in the plurality of ways so that the parking lot point group is displaced by integer multiple of the detected periodic characteristic. The overall coincidence IW is calculated by the following formula 3.

$$IW = DWin/DWall \quad \text{Formula 3}$$

In the formula 3, "DWin" represents the number of points, among the points resulting from the transformation of the point of the local peripheral information 122B into the parking lot coordinate system using the aforementioned coordinate transformation formula, for which the distance to the point of the closest parking lot point group 124A is less than or equal to a predetermined threshold. In the formula 2, "DWall" represents the number of points detected in step S621. Next, the process advances to step S648.

In step S648, the coordinate transformation formula that applies the maximum overall coincidence IW among the plurality of overall coincidences IW calculated in step S647 is stored in the RAM 122 and the process advances to step S650.

A correlating process in step S650, an error minimizing process in step S651, and a convergence determination process in step S652 can use the ICP (Interactive Closest Point) algorithm corresponding to the known point group matching technique. However, since the setting of the initial value in step S650 is unique to the present embodiment, this setting is described in detail and the others are described only briefly.

In step S650 that is executed if the determination in step S643 is positive (YES), if the determination in step S645 is negative (NO), if the process in step S648 ends, or if the determination in step S652 is negative (NO), the correlation between the point group included in the parking lot data of the parking lot point group 124A and the point group included in the local peripheral information 122B is calculated. If it is executed subsequent to step S643 or step S648, the value resulted from the coordinate transformation with the coordinate transformation formula recorded in the RAM 122 is used as the point group data of the local peripheral information 122B. That is to say, if step S650 is executed when the determination in step S643 is positive (YES), the coordinate transformation formula calculated in step S653 that is executed previously is used. On the other hand, if step S650 is executed after step S648, the coordinate transformation formula stored in step S648 is used. Next, the process advances to step S651.

In step S651, the coordinate transformation formula is changed so that the error of the corresponding point is minimized. For example, the coordinate transformation formula is changed so that the total of the indices of the distance between the points correlated in step S650 is minimized. As the total of the indices of the distance between the corresponding points, for example, the total of the absolute values of the distance can be used. In the following step S652, whether the error has been converged is determined. If it is determined that the error has been converged, the process advances to step S653 and if it is determined that the error has not been converged, the process returns to step S650. In the subsequent step S653, the coordinate transformation formula changed in step S651 finally is saved in the RAM 122 and the process advances to step S654.

In step S654, the outlier list 122A is updated as follows. First, the existing outlier list 122A stored in the RAM 122 is cleared. Next, the point group of the local peripheral information 122B is transformed into the parking lot coordinate system using the coordinate transformation formula recorded in step 653, and the distance between each point of the local peripheral information 122B and the point of the parking lot point group 124A of the corresponding point, that is, the Euclid distance is calculated. If the calculated distance is longer than a predetermined distance, the point of the local peripheral information 122B is added to the outlier list 122A. However, in this case, positioning at the end spatially may be another condition for adding the point to the outlier list 122A. The spatial end means, for example, the point acquired when the recording is started and the point that is far from another point. Through the above process, the outlier list 122A is updated. Thus, the flowchart in FIG. 6 ends.

(Autonomous Parking)

With reference to FIG. 7, the autonomous parking process to be executed in step S608 in FIG. 4 is described in detail. A subject that executes each step in the following description is the on-vehicle processing device 120 (calculation unit 121). The calculation unit 121 functions as the autonomous parking unit 121E in the case of executing the process in FIG. 7.

In step S661, the position of the vehicle 1 in the parking lot coordinate system is estimated. Since the process in the present step is similar to that in step S604 in FIG. 4, the description is omitted. In the subsequent step S662, the travel route from the position estimated in step S661 to the parking position stored in the parking lot point group 124A is generated by the known route generating means. Next, the process advances to step S663.

In step S663, the steering device 131, the driving device 132, and the braking device 133 are controlled through the vehicle control device 130, so that the vehicle 1 moves to the parking position along the route generated in step S662. However, an operation instruction may be output to the driving device 132 only while the user keeps pressing the autonomous parking button 110C. In addition, when a person, a moving vehicle, or the like is extracted from the photographed image of the camera 102, the braking device 133 is operated to stop the vehicle 1. In the following step S664, the position of the vehicle 1 is estimated similarly to step S661. In the following step S665, whether the parking has been completed or not, that is, whether the vehicle 1 has reached the parking position or not is determined. If it is determined that the parking has not been completed, the process returns to step S663 and if it is determined that the parking has been completed, the flowchart in FIG. 7 ends.

(Operation Example)

With reference to FIGS. 8A TO 13C, specific operations in the recording phase and the autonomous parking phase are described.

Figure 8A:
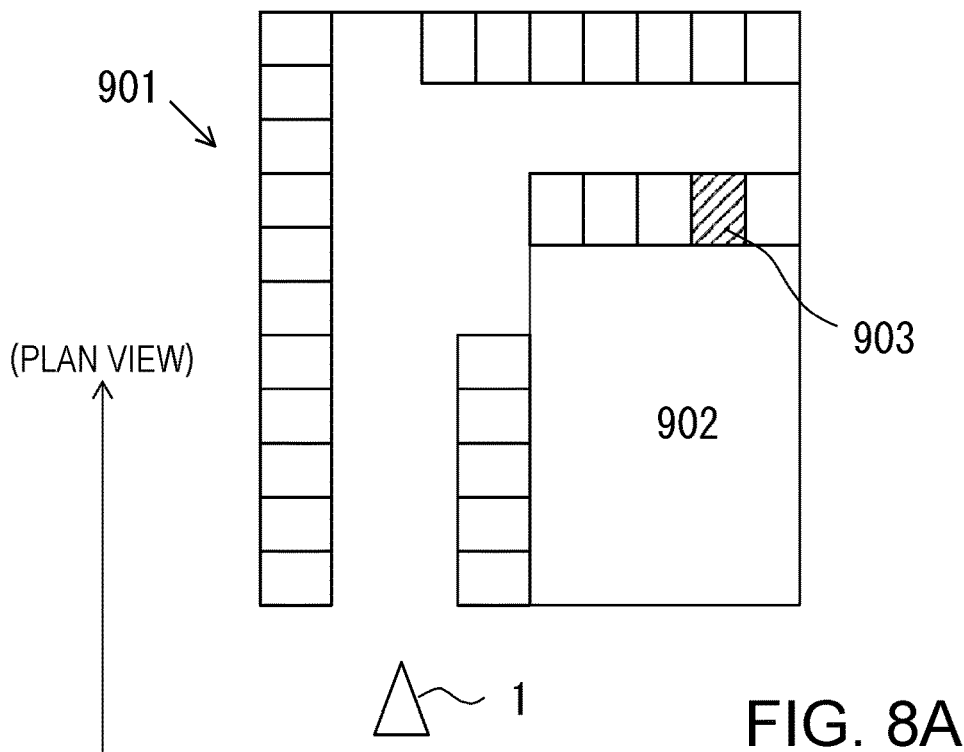
FIG. 8A is plan view illustrating one example of a parking lot and FIG. 8B is a diagram in which a point group of a landmark saved in a RAM is visualized.

FIG. 8A is a plan view illustrating one example of a parking lot 901. The parking lot 901 is provided in the periphery of a building 902. Only one entrance of the parking lot 901 is provided at a lower left in the drawing. Rectangles shown in FIG. 8A represent the parking frames painted on the road surface, and a parking frame 903 that is hatched corresponds to a parking area for the vehicle 1 (area where the vehicle 1 parks when the parking is completed). In the description of the present operation example, the landmark is only the parking frame line. In the present operation example, the vehicle 1 is expressed by a triangle as illustrated in FIG. 8A, and the acute angle of the triangle shows the travel direction of the vehicle 1.

(Operation Example|Recording Phase No. 1)

When the user has pressed the recording-start button 110A near the entrance of the parking lot 901, the on-vehicle processing device 120 starts to measure the position of the landmark, and records the coordinates of the points included in the parking frame line (in FIG. 3, step S501: YES, S502 to S504). Then, the process in steps S502 to S504 in FIG. 3 is repeated until the recording-end button 110B is pressed.

Figure 8B:
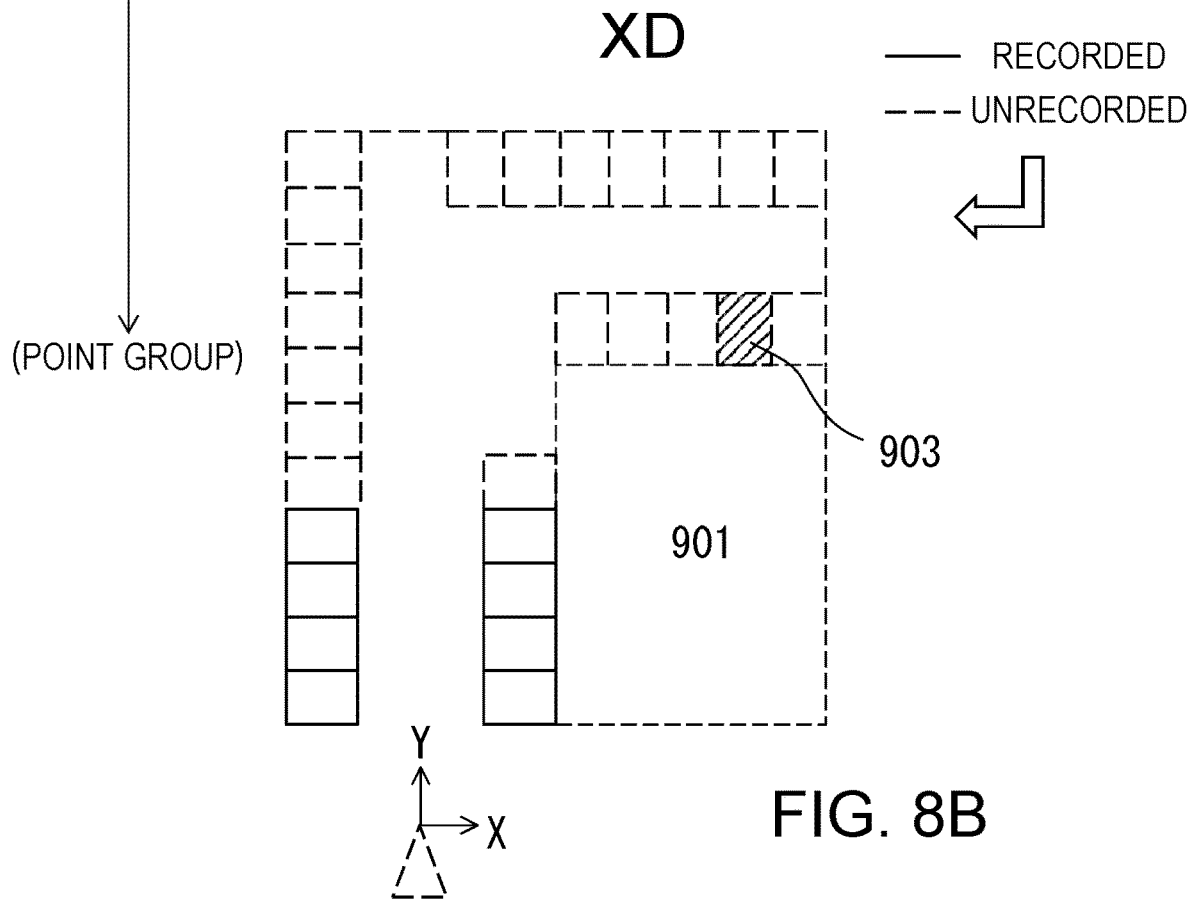

FIG. 8B is a diagram in which the point group of the landmark saved in the RAM 122 is visualized. In FIG. 8B, the solid line expresses the point group of the landmark saved in the RAM 122, and the dashed line expresses the landmark not saved in the RAM 122. Since the camera 102 of the vehicle 1 can photograph a limited range, only the parking frame line near the entrance of the parking lot 901 is recorded when the vehicle 1 is near the entrance of the parking lot 901 as illustrated in FIG. 8B. When the user has moved the vehicle 1 to proceed into the parking lot 901, the on-vehicle processing device 120 can record the point group of the landmark throughout the parking lot 901.

When the user has stopped the vehicle 1 in the parking frame 903 and pressed the recording-end button 110B, the on-vehicle processing device 120 acquires the latitude and the longitude of the vehicle 1 from the GPS receiver 107 and records the coordinates of the four corners of the vehicle 1 (step S505: YES, S505A). If the latitude and the longitude that substantially coincide with the current latitude and longitude of the vehicle 1 are not recorded in the parking lot point group 124A (S506: NO), the point group saved in the RAM 122 is recorded as a new piece of data that forms the parking lot point group 124A, that is, a new piece of parking lot data.

(Operation Example|Recording Phase No. 2)

Figure 9A:
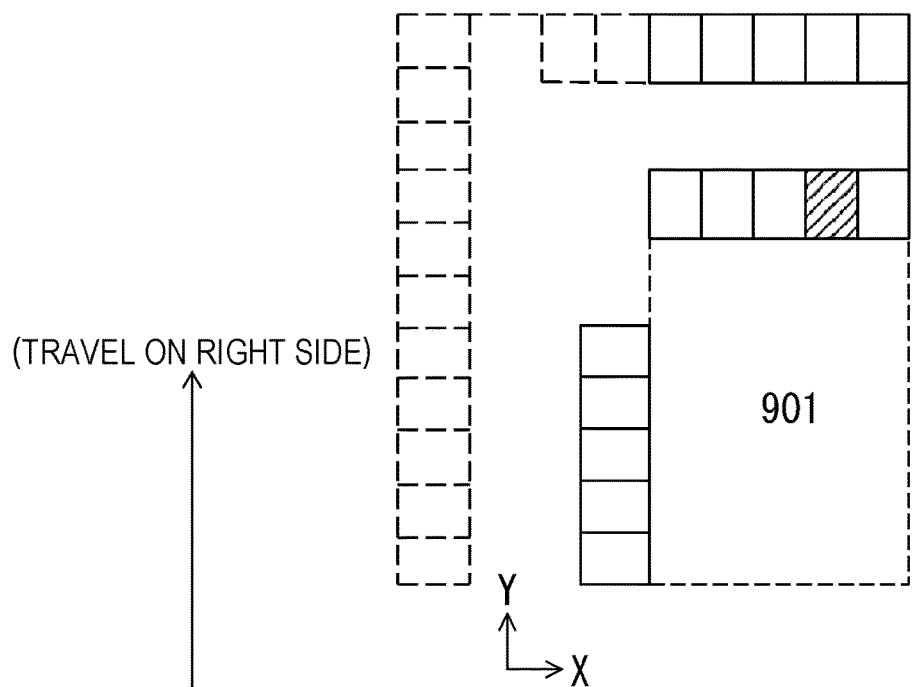
FIG. 9A is a diagram in which point group data of a parking lot point group are visualized and FIG. 9B is a diagram in which newly detected point group data are visualized.
Figure 9B:
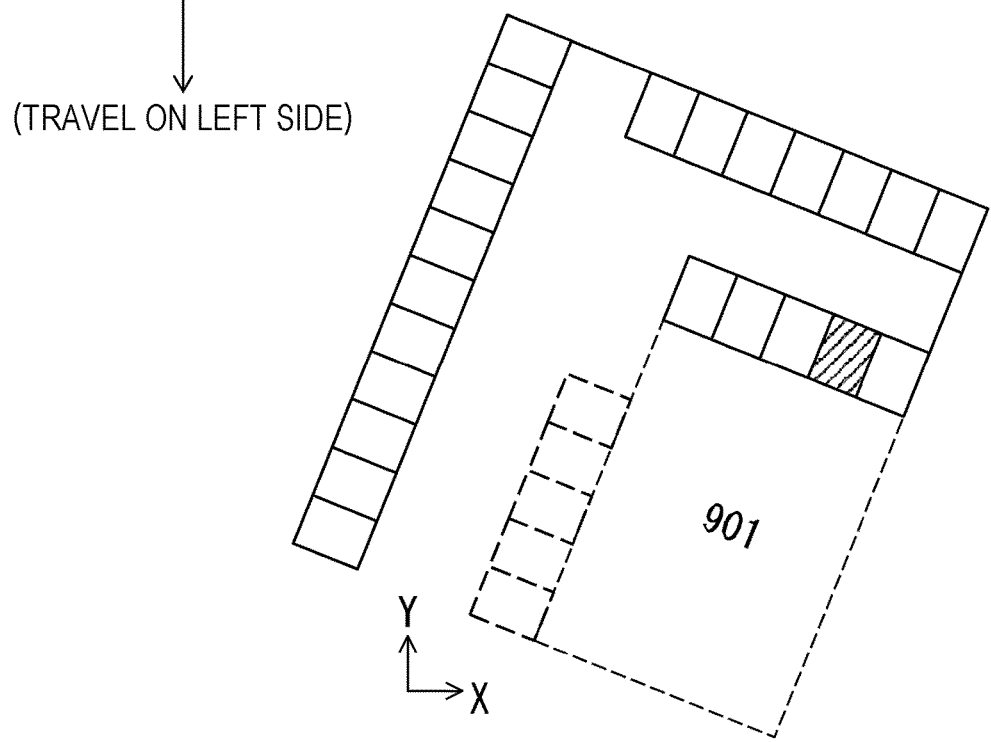

As another example, description is made of a case in which the point group data shown in FIG. 9A are recorded as the parking lot data of the parking lot point group 124A, and the point group data shown in FIG. 9B are newly obtained. The point group data shown in FIG. 9A correspond to the point group data obtained in the case where, for example, the vehicle traveling on the right side from the entrance of the parking lot 901 shown in FIG. 8A has reached the parking position. Since the vehicle travels on the right side compared to the case in FIG. 8A, the point group data of the parking frame that is expressed by the dotted line in FIG. 9A are not acquired.

The point group data shown in FIG. 9B correspond to the point group data obtained in the case where, for example, the vehicle traveling on the left side from the entrance of the parking lot 901 has reached the parking position. Since the vehicle travels on the left side compared to the case in FIG.

8A, the point group data of the parking frame that is expressed by the dotted line in FIG. 9B are not acquired. In addition, the point group data in FIG. 9B are recorded in a manner that the parking lot 901 is inclined as compared to that in FIG. 9A because when the user pressed the recording-start button 110A, the vehicle 1 did not face the front of the parking lot 901.

If it is determined that the latitude and the longitude that substantially coincide with the current latitude and longitude of the vehicle 1 have already been recorded in the parking lot point group 124A when the user pressed the recording-end button 110B in this state (S506: YES), the coordinate transformation is performed based on the parking position in FIG. 9A and FIG. 9B, that is, the parking frame 903 (step S507). Then, the point group coincidence IB is calculated (step S507A), and if it is determined that the point group coincidence IB is more than a predetermined threshold (step S508: YES), the point group data shown in FIG. 9B are merged with the point group data shown in FIG. 9A (step S509). By this merge, the point groups of the parking frame lines on the left side in the drawing that are not recorded in FIG. 9A are newly recorded and additionally, the point groups of the parking frame lines on the right side and upper side in the drawing that have already been recorded are recorded, so that the point groups are more densely shown.

(Operation Example|Executing Phase)

An operation example of the matching process in the executing phase is described. In this operation example, the point group data corresponding to the entire parking lot 901 shown in FIG. 8A are stored in advance in the parking lot point group 124A.

Figure 9C:
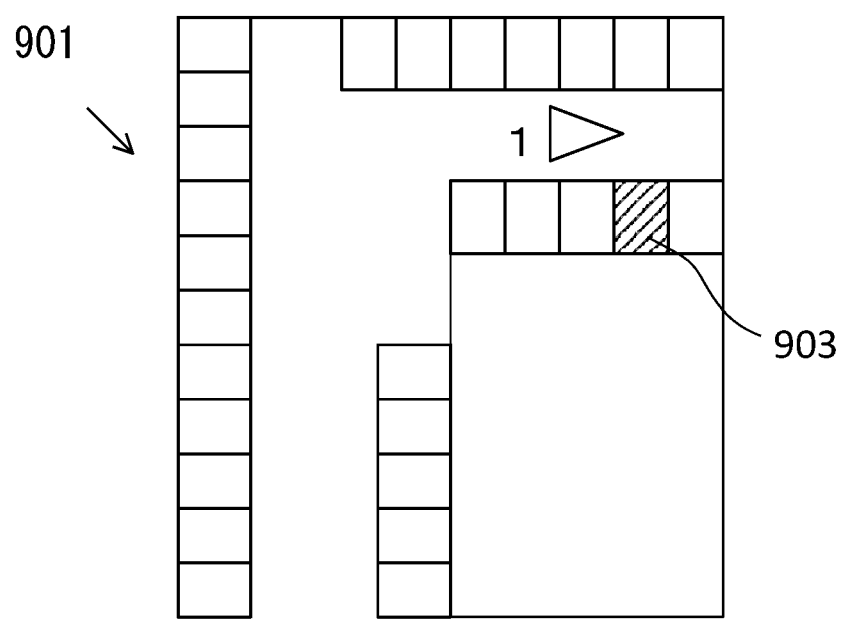
FIG. 9C is a diagram showing a current position of a vehicle in the parking lot.

FIG. 9C shows the current position of the vehicle 1 in the parking lot 901 illustrated in FIG. 8A. The vehicle 1 faces the right side in the drawing.

Figure 9D:
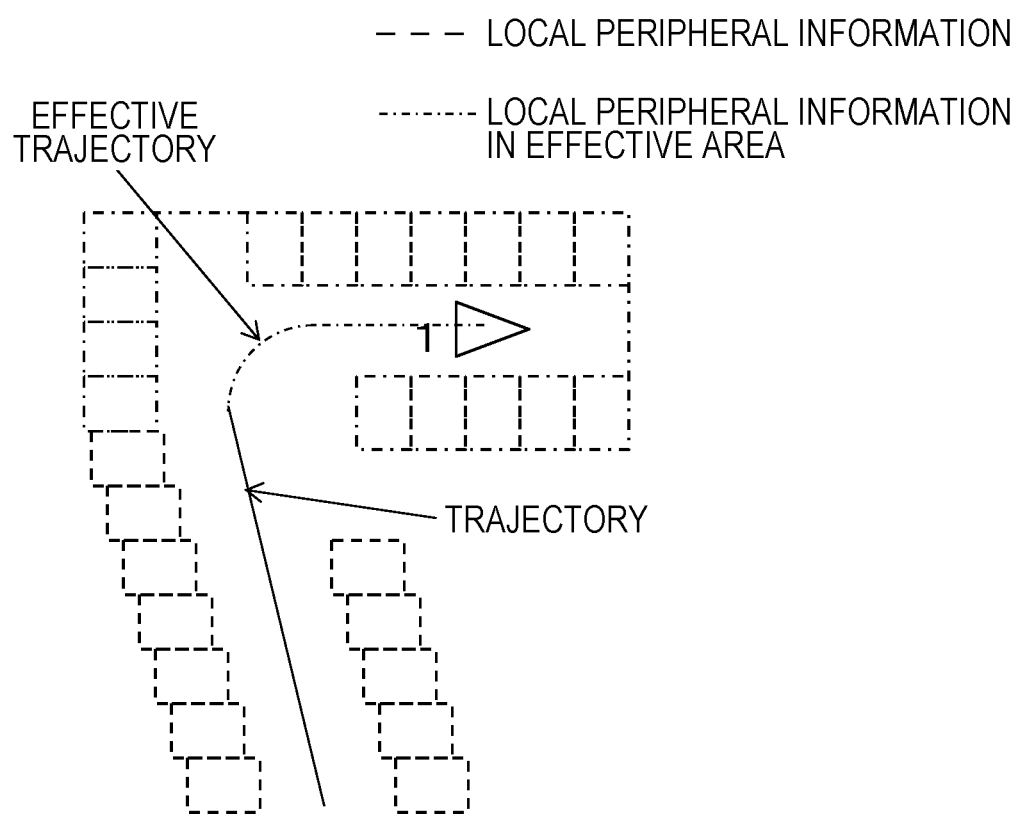
FIG. 9D is a diagram showing data in a parking lot coordinate, resulting from transformation of a point group extracted from an image photographed by the vehicle at a position shown in FIG. 9C.

FIG. 9D is a diagram showing data in the parking lot coordinate, resulting from transformation of the point group extracted from the image that the vehicle 1 has photographed before reaching the position shown in FIG. 9C. In this drawing, the point group of the local peripheral information is expressed by a dashed line and a dash-dot line. In addition, the travel trajectory is expressed by a solid line and a dash-dot line. Since the error is generated in the turning, the point group shape as a whole changes and thus, it is supposed that even if the matching is performed as a whole in this state, the whole does not coincide. In addition, the effective trajectory and the ineffective part are separately shown. The effective trajectory goes along the travel trajectory from the own vehicle position and ends after the vehicle turns largely. By using the points within a predetermined range from the effective trajectory as a center in the matching, the matching can be performed correctly.

Figure 9E:
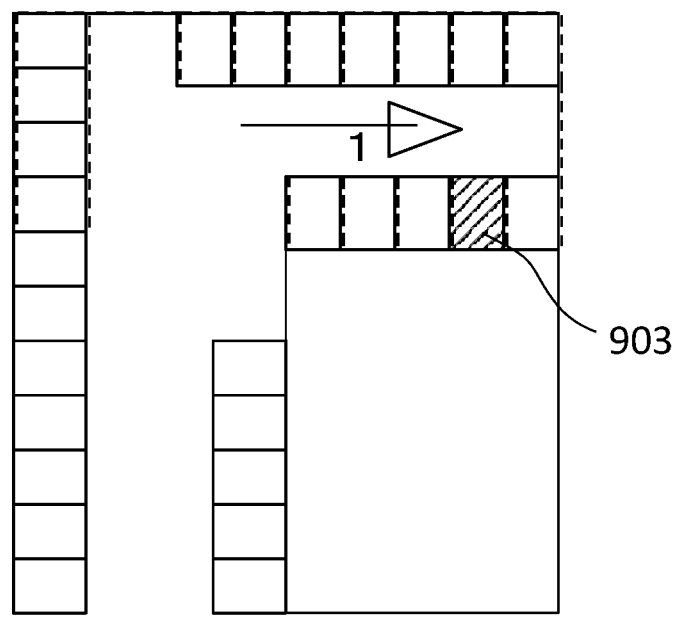
FIG. 9E is a diagram showing a result of matching with the use of the point group in an effective range.

FIG. 9E shows the result of matching with the use of the point group in the effective range.

Figure 10:
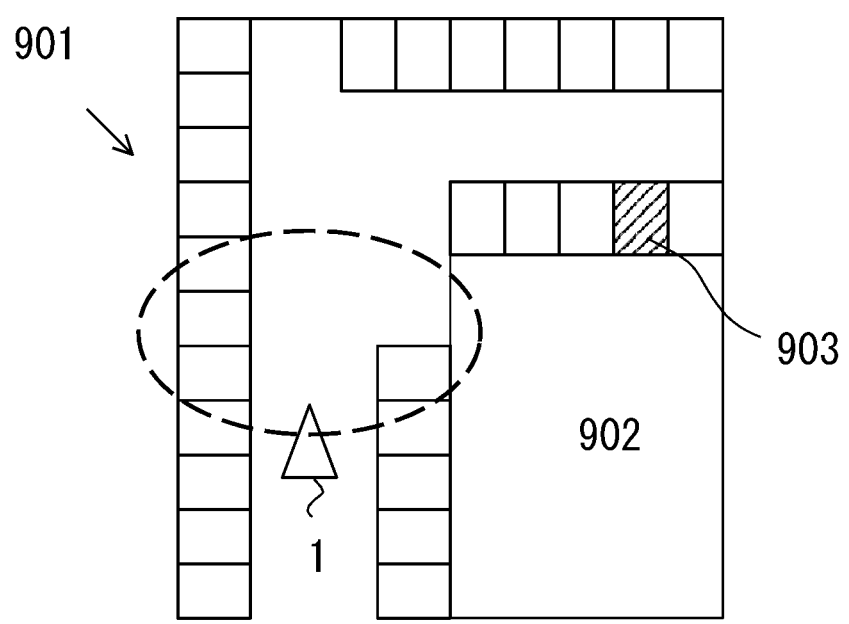
FIG. 10 is a diagram showing the current position of the vehicle in the parking lot.
Figure 11:
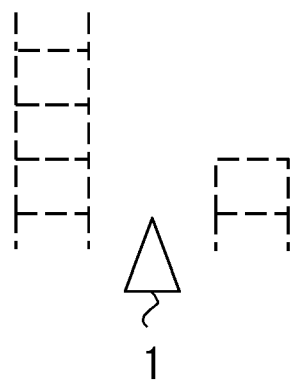
FIG. 11 is a diagram showing data in the parking lot coordinate, resulting from transformation of the point group extracted from the image photographed by the vehicle at the position shown in FIG. 10.
Figure 12:
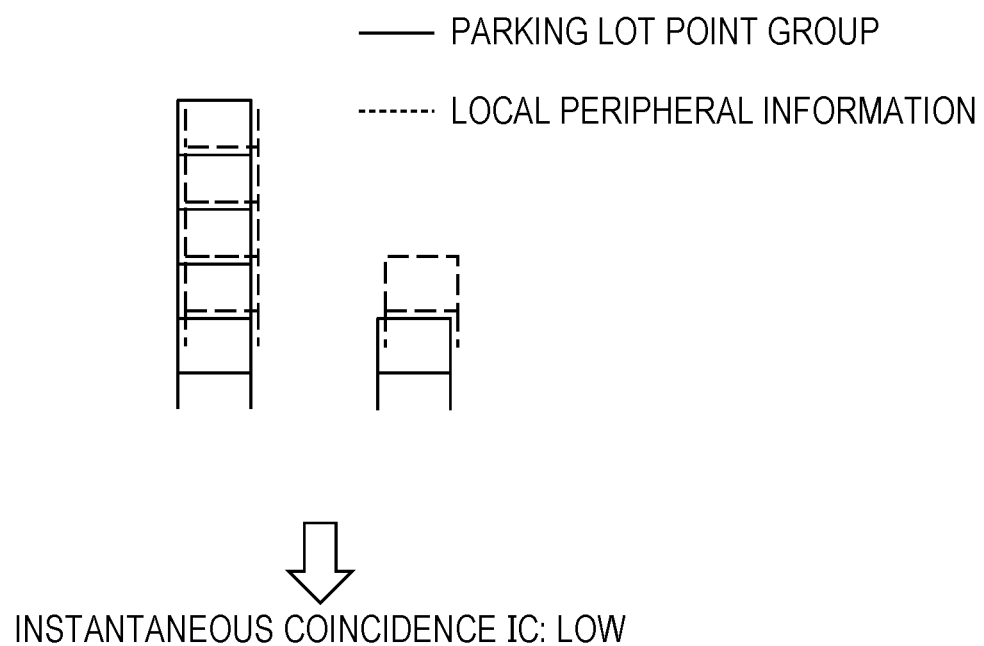
FIG. 12 is a diagram showing a comparison between the local peripheral information shown in FIG. 11 and the parking lot point group in a case where the estimation of the position of the vehicle in the parking lot coordinate system includes an error.

FIG. 10 is a diagram showing the current position of the vehicle 1 in the parking lot 901 illustrated in FIG. 8A. The vehicle 1 faces the upper side in the drawing. FIG. 11 to FIG. 12 show the parking frame lines in a part that is surrounded by a dashed circle, corresponding to an area ahead of the vehicle 1 in FIG. 10.

FIG. 11 is a diagram showing data in the parking lot coordinate, resulting from transformation of the point group extracted from the image photographed by the vehicle 1 at the position shown in FIG. 10. That is to say, the point group shown in FIG. 11 corresponds to the point group detected from the latest photographed image among the local peripheral information 122B, and the data processed in step S641A in FIG. 6. However, the point group is not shown as the point but shown as the dashed line in FIG. 11. FIG. 11 also shows the vehicle 1 in order to compare with FIG. 10. As shown in FIG. 11, the point group data of the parking frame lines are shown without an interval on the left side of the vehicle 1, and on the right side of the vehicle 1, the point group data of the parking frame lines exist only on the front side.

FIG. 12 shows the comparison between the parking lot point group 124A and the local peripheral information 122B shown in FIG. 11 in the case where the estimation of the position of the vehicle 1 in the parking lot coordinate system includes the error. In FIG. 12, since the previously estimated position is displaced by the width of one parking frame, the local peripheral information 122B existing on the right side of the vehicle 1 is displaced from the parking lot point group 124A. If the instantaneous coincidence IC is calculated in this state (step S642 in FIG. 6), the instantaneous coincidence IC becomes low due to the aforementioned displacement on the right side of the vehicle 1. If it is determined that this value is lower than the threshold (step S643: NO), the parking frame is detected as the periodic characteristic (steps S644, S645: YES), the width of the parking frame is calculated from the parking lot point group 124A (step S646), and the information is moved by the integer multiple of the width of the parking frame; thus the overall coincidence IW is calculated (step S647).

Figure 13A:
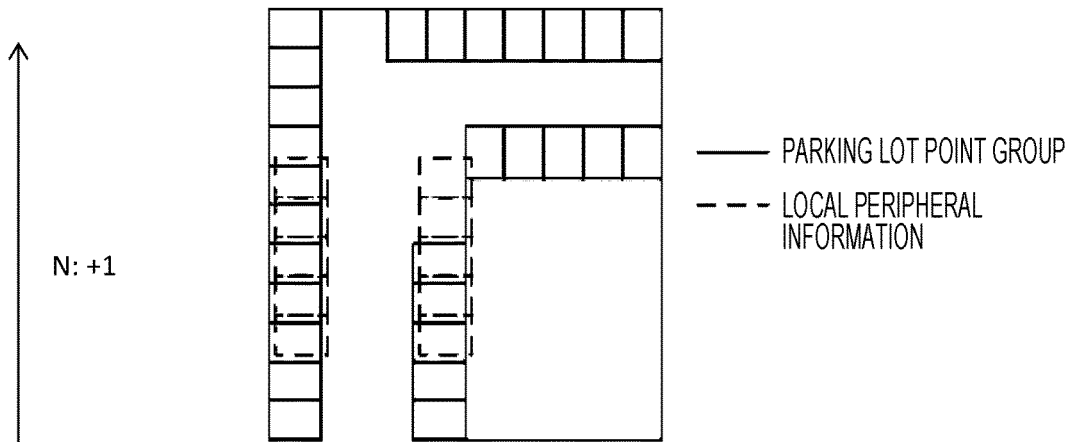
FIGS. 13A to 13C are diagrams showing a relation with the parking lot point group in a case where the local peripheral information shown in FIGS. 13A to 13C is moved by integer multiple of the width of a parking frame.
Figure 13B:
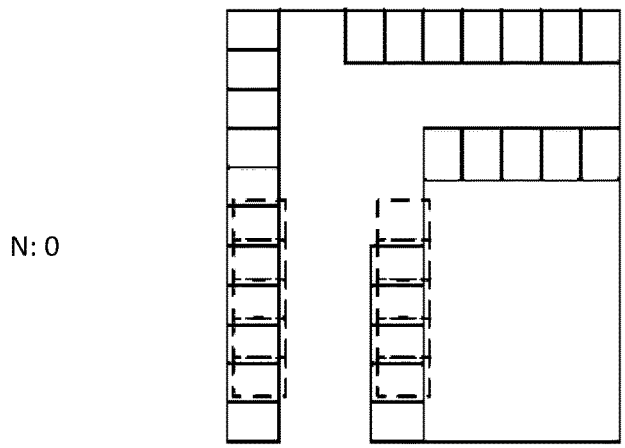
Figure 13C:
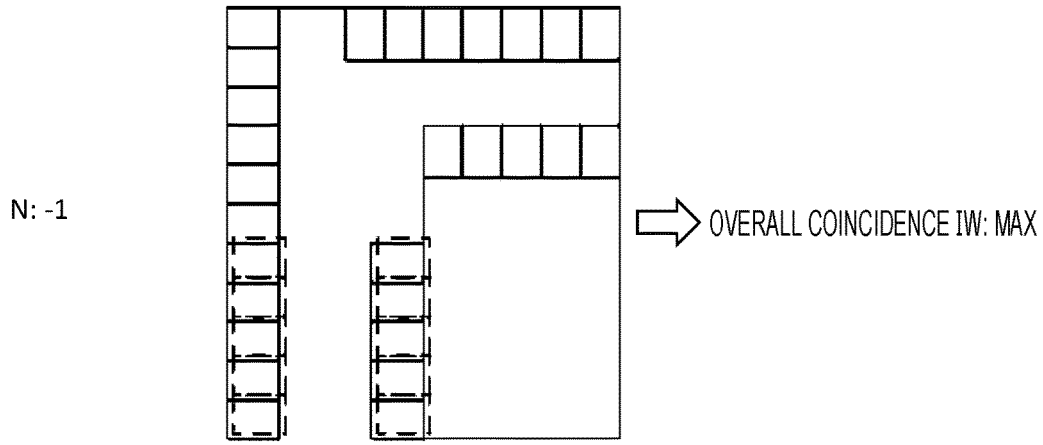

FIGS. 13A to 13C show the relation with the parking lot point group 124A in the case where the local peripheral information 122B shown in FIGS. 13A to 13C has been moved by the integer multiple of the width of the parking frame. In each of FIGS. 13A to 13C, the local peripheral information 122B shown in FIGS. 13A to 13C is moved upward in the drawing by +1, 0, or −1 times the width of the parking frame. In FIG. 13A, the local peripheral information 122B is moved by the width of one parking frame to the upper side in the drawing, and the displacement between the local peripheral information 122B and the parking lot point group 124A expands. Therefore, the overall coincidence IW in FIG. 13A is smaller than that in the case where the information is not moved. In FIG. 13B, the local peripheral information 122B is not moved and the local peripheral information 122B and the parking lot point group 124A are displaced by the width of one parking frame as shown in FIG. 12. In FIG. 13C, the local peripheral information 122B is moved by the width of one parking frame to the lower side in the drawing, and the local peripheral information 122B substantially coincides with the parking lot point group 124A. Therefore, the overall coincidence IW in FIG. 13C is more than that in the case where the local peripheral information 122B is not moved.

The movement quantity of the local peripheral information 122B and the increase or decrease of the overall coincidence IW are in the aforementioned relation. Therefore, in the example in FIGS. 13A to 13C, it is determined that the overall coincidence IW for FIG. 13C is the maximum and the coordinate transformation formula for this movement is stored in the RAM 122 (step S648). In this manner, the on-vehicle processing device 120 estimates the position with higher accuracy.

According to the first embodiment described above, the following operation effect is obtained.

(1) The on-vehicle processing device 120 includes: the storage unit 124 that stores the first point group data (parking lot point group 124A) including the plurality of coordinates of the points of a part of the object in the first coordinate system (parking lot coordinate system); the sensor input unit (interface 125) that acquires from the camera 102 that detects the peripheral information expressing the image of the object around the vehicle 1 or the distance to the object, the peripheral information; the movement information acquisition unit (interface 125) that acquires the movement information expressing the movement quantity and the movement direction of the vehicle 1; the local peripheral information creation unit 121B that generates the local peripheral information 122B expressing second point group data including the position of the vehicle in the second coordinate system (local coordinate system) and the plurality of coordinates of points of a part of the object in the second coordinate system (local coordinate system) on the basis of the peripheral information and the movement information; and the position estimation unit 121C that estimates the correlation between the parking lot coordinate system and the local coordinate system on the basis of the parking lot point group 124A and the local peripheral information 122B, and estimates the position of the vehicle 1 in the first coordinate system from the position of the vehicle 1 in the second coordinate system and the correlation.

The on-vehicle processing device 120 estimates the coordinate transformation formula for the parking lot coordinate system and the local coordinate system on the basis of the parking lot point group 124A and the local peripheral information 122B, and estimates the position of the vehicle 1 in the parking lot coordinate system. The parking lot point group 124A is the information that is stored in advance in the storage unit 124, and the local peripheral information 122B is generated based on the output from the camera 102, the vehicle speed sensor 108, and the steering angle sensor 109. That is to say, the on-vehicle processing device 120 can acquire the information of the point group in the coordinate system that is different from the coordinate system of the recorded point group, and on the basis of the correlation between the different coordinate systems, can estimate the position of the vehicle in the recorded coordinate system. In addition, the on-vehicle processing device 120 estimates the coordinate transformation formula for the parking lot coordinate system and the local coordinate system on the basis of the parking lot point group 124A and the local peripheral information 122B; therefore, even if a part of the point group data of the local peripheral information 122B includes some noise, the on-vehicle processing device 120 is affected less easily. That is to say, the estimation of the position of the vehicle 1 by the on-vehicle processing device 120 resists against the disturbance.

(2) The position estimation unit 121C searches the first point group data (parking lot point group 124A) for the point corresponding to each point of the second point group data expressed by the local peripheral information 122B (step S650 in FIG. 6), and estimates the coordinate transformation formula for the first coordinate system and the second coordinate system so that the distance between the corresponding points is minimized (step S651 in FIG. 6).

(3) The position estimation unit 121C performs the search and the estimation after excluding the point data of the local peripheral information in which the distance between the corresponding points is more than the predetermined threshold, from the second point group data expressed by the local peripheral information, that is, by applying the outlier list 122A (steps S641, S653 in FIG. 6). Therefore, since the point group data that are separated, which can be regarded as the noise component, are excluded from the calculation object, the accuracy of the coordinate transformation formula can be improved.

(4) The first point group data (parking lot point group 124A) and the second point group data expressed by the local peripheral information are shown as the coordinates in the two-dimensional space. The position estimation unit 121C performs the search and the estimation after excluding the point data of the point where the distance between the corresponding points is more than the predetermined threshold and which is positioned spatially at an end among the second point group data expressed by the local peripheral information 122B.

The point group stored in the parking lot data in the parking lot point group 124A is related to the landmark closer to the parking position than the place where the user has pressed the recording-start button 110A. When the operation in the flowchart shown in FIG. 4 is started at the place farther from the parking area than that place, the point that corresponds to none of the points stored in the parking lot data is included in the local peripheral information 122B. If ICP, that is, the process in steps S650 to S652 in FIG. 6 is performed in consideration of this point, the appropriate solution is not obtained. In view of the above, by excluding these, the solution is obtained.

(5) The local peripheral information creation unit 121B calculates the trajectory of the vehicle 1 on the basis of the movement information. The local peripheral information selection unit 121D selects the second point group data from the local peripheral information 122B on the basis of the length of the trajectory and the shape of the trajectory. The position estimation unit 121C matches the first point group data (parking lot point group 124A) and the second point group data (local peripheral information 122B) that are selected. Thus, for example, while the characteristic point of the landmark necessary for the matching is secured, the deterioration in accuracy in estimating the position of the vehicle by the dead reckoning or the like can be suppressed.

(6) The first point group data (parking lot point group 124A) include the periodic characteristic. The position estimation unit 121C, after estimating the coordinate transformation formula for the first coordinate system and the second coordinate system, corrects the coordinate transformation formula for the first coordinate system and the second coordinate system on the basis of the distance for one period of the periodic characteristic so that the distance between the corresponding points becomes shorter (steps S646 to S648 in FIG. 6).

In general, if the point group data include the periodic characteristic, the matching tends to occur with the displacement by the integer multiple of the distance corresponding to that period. Once the matching occurs with such a displacement, it is difficult to match at the correct position because of the nature of the repeating process. In view of this, this problem is solved by displacing by the integer multiple of the period after the solution of the repeating process is converged. In other words, in consideration of the possibility that because of the repeated calculations, the solution has become the local solution that is displaced from the global solution by several periods of the periodic characteristic, the solution is displaced by several periods of the period; thus, the global solution or the local solution close to the global solution can be obtained.

(7) The position estimation unit 121C performs the correction if the instantaneous coincidence IC corresponding to the index expressing the coincidence between the first point group data (parking lot point group 124A) in the first coordinate system and the local peripheral information in the first coordinate system resulting from the transformation, by the coordinate transformation formula, of the local peripheral information that is created based on the previously estimated position of the vehicle in the first coordinate system, the latest peripheral information that is acquired by the sensor input unit, and the latest movement information that is acquired by the movement information acquisition unit is lower than the predetermined threshold (steps S641A to S643 in FIG. 6). Therefore, the process in steps S644 to S648 in FIG. 6 is not always performed but is performed only when it is necessary as a result of examining the necessity of the process.

(8) The on-vehicle processing device 120 includes the point group data acquisition unit 121A that creates the third point group data (parking lot point group 122C) including the plurality of coordinates of the points of a part of the object excluding the mobile body in the third coordinate system (recording coordinate system) on the basis of the peripheral information and the movement information, and stores the third point group data in the storage unit 124 as the parking lot point group 124A. Therefore, the on-vehicle processing device 120 can create the parking lot point group 124A when the vehicle 1 including the on-vehicle processing device 120 travels. The process of creating the parking lot point group 124A and the process of estimating the position of the vehicle 1 are common in measuring the position of the landmark, and the program module can be commonly used.

(9) The third coordinate system (recording coordinate system) is set based on the position and the posture of the vehicle when the creation of the third point group data (parking lot point group 122C) is started. When the plurality of pieces of third point group data in which the coordinate systems are different because the position or posture of the vehicle is different when the creation of the third point group data is started are obtained, the point group data acquisition unit 121A estimates the correlation of the coordinate systems that are different, on the basis of the parking position of the vehicle 1, and merges the plurality of pieces of third point group data (steps S507, S509 in FIG. 3). Therefore, even if the different recording coordinate system is set every time the point group data are acquired, the plurality of pieces of point group data can be merged. This is based on the fact that: although the position at which the acquisition of the point group data is started and the posture of the vehicle 1 at that time vary, the vehicle 1 is parked at the same parking position.

(10) The on-vehicle processing device 120 includes: the autonomous parking unit 121E that drives the vehicle on the basis of the first point group data (parking lot point group 124A) and the position of the vehicle that is estimated by the position estimation unit 121C, and moves the vehicle to the parking position that is specified in advance in the first coordinate system; and the positional information acquisition unit (interface 125) that acquires from the GPS receiver 107 (receiver) that receives the positional information (latitude and longitude) expressing the position of the vehicle 1, the latitude and the longitude of the vehicle 1. The point of the parking lot point group 124A is the point expressing a part of the structure (object) in the parking lot. That is to say, the object is the structure in the parking lot. The storage unit 124 stores the positional information (latitude and longitude) of the parking lot altogether. The autonomous parking unit 121E moves the vehicle 1 to the parking position using the vehicle control device 130 if the difference in distance between the position of the vehicle that is expressed by the positional information measured (acquired) by the GPS receiver 107 and the position of the parking lot that is expressed by the positional information of the parking lot stored in the storage unit 124 is shorter than a predetermined distance. Therefore, the on-vehicle processing device 120 can autonomously park the vehicle 1 at the parking position included in the parking lot point group 124A using, as the start point, the far place where none of the sensors in the vehicle 1 can observe the parking position directly.

The first embodiment described above may be modified as below.

(1) The on-vehicle processing device 120 may be connected to a plurality of cameras. By using the photographed images of the cameras, the on-vehicle processing device 120 can extract the point group from the landmark in a wider range existing around the vehicle 1.

(2) The on-vehicle processing device 120 does not need to receive the sensing result from the vehicle speed sensor 108 and the steering angle sensor 109. In this case, the on-vehicle processing device 120 estimates the movement of the vehicle 1 using the photographed image of the camera 102. The on-vehicle processing device 120 calculates the positional relation between the subject and the camera 102 using the internal parameters and the external parameters stored in the ROM 123. By tracking the subject in the photographed images, the movement quantity and the movement direction of the vehicle 1 are estimated.

(3) The point group information such as the parking lot point group 124A and the local peripheral information 122B may be stored as the three-dimensional information. The three-dimensional point group information may be compared with another point group two-dimensionally by being projected on the two-dimensional plane similarly to the first embodiment, or may be compared with another three-dimensional one. In this case, the on-vehicle processing device 120 can obtain the three-dimensional point group of the landmark as below. That is to say, the three-dimensional point group of the still solid object can be obtained by the known motion stereo technique using the movement quantity of the vehicle 1 that is calculated based on the output from the vehicle speed sensor 108 and the steering angle sensor 109 and the photographed images output from the camera 102, or using the information resulting from the correction of the motion estimated part with the use of an internal sensor or a position measurement sensor.

(4) The on-vehicle processing device 120 may, instead of advancing to step S644 after just one negative determination (NO) in step S643 in FIG. 6, advance to step S644 after several consecutive negative determinations.

(5) The on-vehicle processing device 120 may, instead of determination in step S643 in FIG. 6, determine whether the ratio of the points determined to be outlier in the local peripheral information 122B is more than a predetermined threshold. If the ratio is more than the threshold, the process advances to step S644, and if the ratio is less than or equal to the threshold, the process advances to step S650. In addition, the on-vehicle processing device 120 may advance to step S644 only if the ratio is more in addition to the determination in step S643 in FIG. 6.

(6) The on-vehicle processing device 120 may perform the process in steps S644 and S646 in FIG. 6 in advance. In addition, the process results may be recorded in the storage unit 124.

(7) The on-vehicle processing device 120 may receive the operation instruction from the user not just from the input device 110 provided in the vehicle 1 but also from the communication device 114. For example, the communication device 114 may communicate with the mobile terminal of the user and when the user operates the mobile terminal, the on-vehicle processing device 120 may perform the operation similar to that in the case where the autonomous parking button 110C is pressed. In this case, the on-vehicle processing device 120 can perform the autonomous parking not just when the user is within the vehicle 1 but also after the user gets off.

(8) The on-vehicle processing device 120 may park the vehicle not just at the parking position recorded in the parking lot point group 124A but also at the position specified by the user. The user specifies the parking position in a manner that the on-vehicle processing device 120 causes the display device 111 to display the candidates of the parking position, and the user selects any of them through the input device 110.

(9) The on-vehicle processing device 120 may receive the parking lot point group 124A from the outside through the communication device 114, or transmit the created parking lot point group 124A to the outside through the communication device 114. The on-vehicle processing device 120 may transmit or receive the parking lot point group 124A to or from the on-vehicle processing device 120 mounted in another vehicle, or a device managed by an organization that manages the parking lot.

(10) The autonomous parking system 100 may include a mobile terminal instead of the GPS receiver 107 and the mobile terminal may record the identification information of a base station with which the mobile terminal communicates instead of the latitude and the longitude. In this case, since the communication range of the base station is limited within several hundreds of meters, if the base station to communicate with is the same, the parking lot is highly likely the same.

(11) The periodic characteristic included in the parking lot data is not limited to the parking frame. For example, a plurality of lines of a crosswalk, which is one of the paints on the road surface, is also the periodic characteristic. In addition, if the parking lot data include the information of the obstacle such as the wall, which is acquired by the laser radar or the like, pillars that are arranged regularly are also the periodic characteristic.

(12) Although the vehicle or the person corresponding to the mobile body is not included in the landmark in the above embodiment, the mobile body may be included in the landmark. In this case, the landmark corresponding to the mobile body and the landmark not corresponding to the mobile body may be stored in a way that these landmarks can be distinguished.

(13) The on-vehicle processing device 120 may identify the detected landmark and record the identification result of the landmarks additionally in the parking lot point group 124A in the recording phase. To identify the landmark, the shape information or the color information of the landmark obtained from the photographed image or the stereoscopic shape information of the landmark based on the known motion stereo technique is used. The landmark is identified as, for example, the parking frame, the paint on the road surface other than the parking frame, the curbstone, the guard rail, or the wall. Furthermore, the on-vehicle processing device 120 may include the vehicle and the person corresponding to the mobile body in the landmark and record the identification result in the parking lot point group 124A similarly to other landmarks. In this case, the vehicle and the person may be collectively identified and recorded as "the mobile body" or may be individually identified and recorded.

As described above, according to the present embodiment, the position of the vehicle can be estimated with higher accuracy.

Second Embodiment

With reference to FIG. 14 to FIG. 16B, an on-vehicle processing device according to a second embodiment of the present invention is described. In the following description, the same component as that of the first embodiment is denoted by the same reference sign, and the different point is described mainly. Regarding the part that is not described, the second embodiment is the same as the first embodiment. The present embodiment is different from the first embodiment in that, mainly, a laser radar is provided instead of the camera to acquire point group data of a still solid object.
(Structure)

Figure 14:
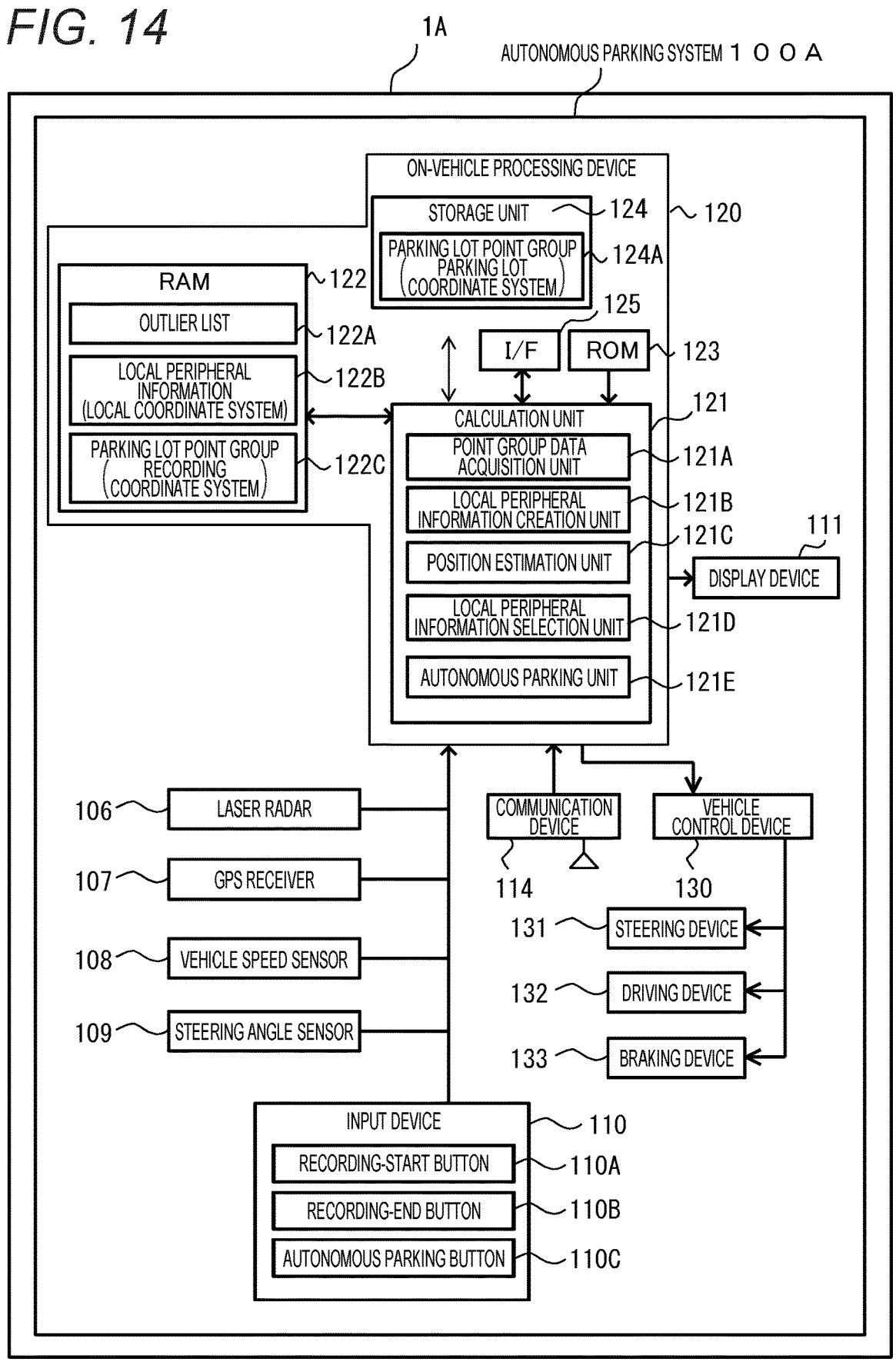
FIG. 14 is a structure diagram illustrating an autonomous parking system including an on-vehicle processing device according to a second embodiment of the present invention.

FIG. 14 is a structure diagram of an autonomous parking system 100A according to the second embodiment. The autonomous parking system 100A has a structure in which the camera 102 is excluded from, and a laser radar 106 is added to the autonomous parking system 100 according to the first embodiment. The on-vehicle processing device 120 has a structure similar to that of the first embodiment. The autonomous parking system 100A is included in a vehicle 1A. In the present embodiment, the shape of the still solid object is used as the landmark.

The laser radar 106 measures the distance to the object on the basis of the time after the laser is emitted and before the reflection wave thereof is observed, and outputs the measured distance to the on-vehicle processing device 120. Moreover, by changing the emission direction of the laser in the up-down direction and the left-right direction, the three-dimensional information of the landmark can be acquired. Furthermore, based on the difference in reflectance among the materials, for example, the on-vehicle processing device 120 can detect the paint on the road surface.

The on-vehicle processing device 120 can recognize the person and the vehicle through two-dimensional or three-dimensional template matching by the use of the signal obtained from the laser radar 106, and exclude the person and the vehicle in the measurement of the position of the landmark. In the case where the speed where the distance to the object changes and the speed where the vehicle 1 moves do not coincide, the object is determined to be the moving object and the data regarding the moving object may be excluded in the measurement of the position of the landmark. The operation of the on-vehicle processing device 120 is similar to that in the first embodiment.
(Operation Example)

Figure 15:
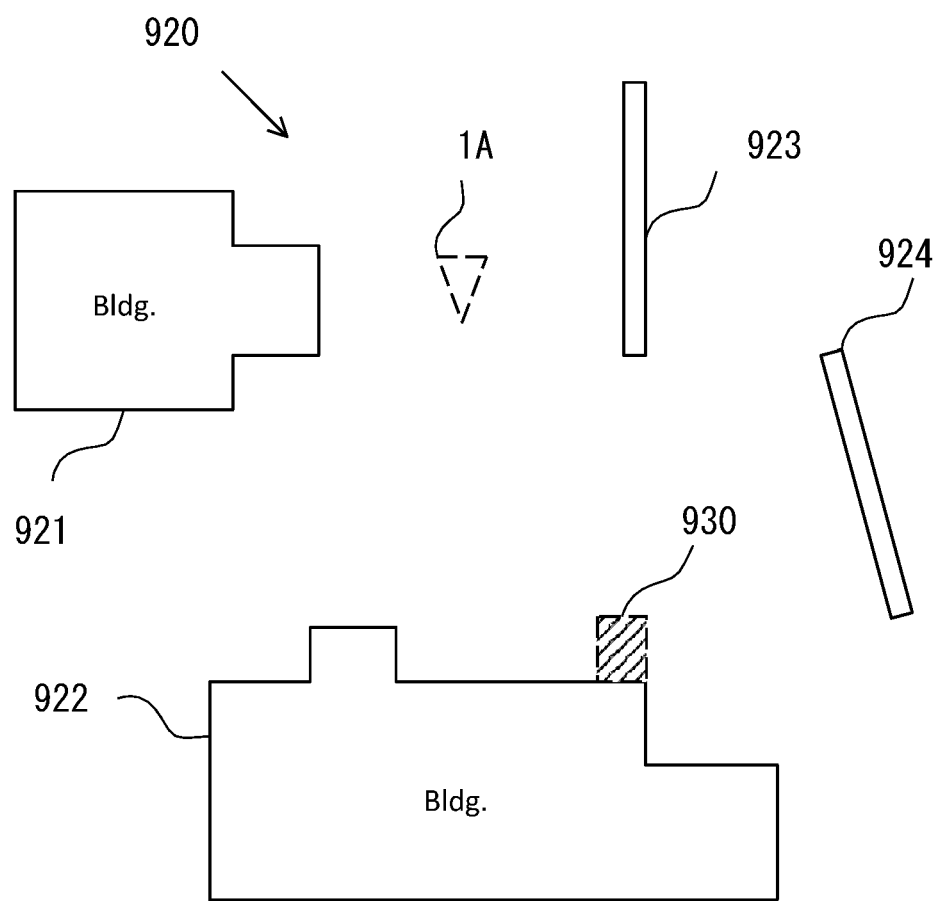
FIG. 15 is a diagram illustrating one example of a parking lot in the second embodiment.

FIG. 15 is a diagram illustrating one example of a parking lot in the second embodiment. A parking lot 920 is an area surrounded by a building 921, a building 922, a guard rail 923, and a guard rail 924 that are the still solid objects. A parking area for the vehicle 1 in the parking lot 920 is an area denoted by reference sign 930.

In the storage unit 124 of the on-vehicle processing device 120, the parking lot data of the parking lot 920 obtained by the laser radar 106 when the vehicle 1A travels in advance in the recording phase are stored as the parking lot point group 124A. The vehicle 1A travels in the parking lot 920 a plurality of times in the recording phase, and the dense point group data are obtained by the aforementioned merging process (step S509 in FIG. 3).

Figure 16A:
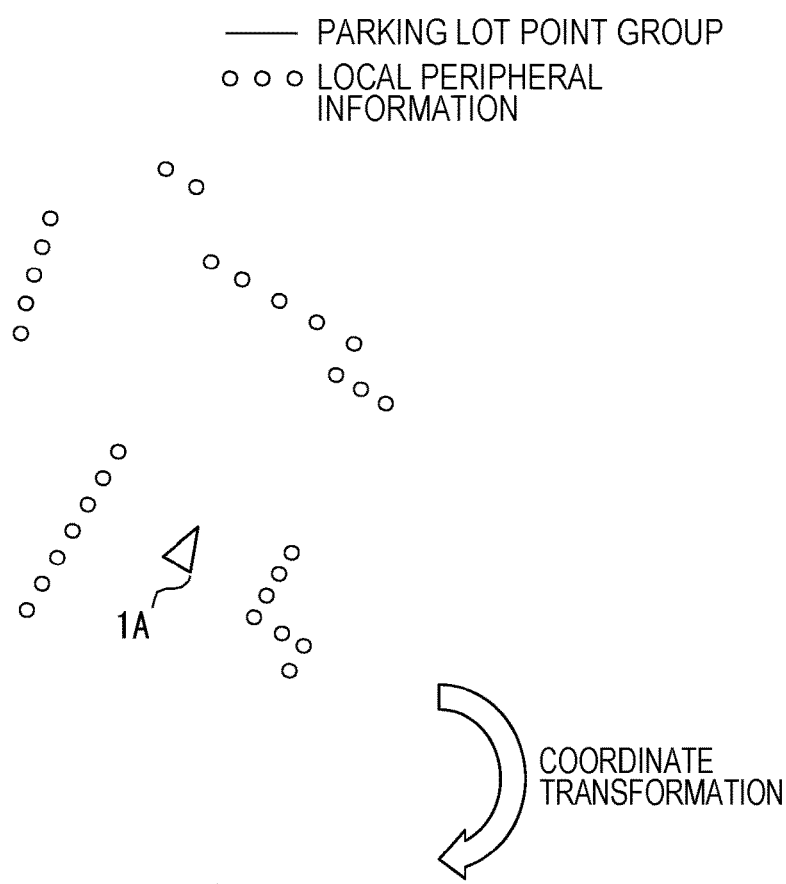
FIG. 16A is a diagram showing local peripheral information in an operation example.
Figure 16B:
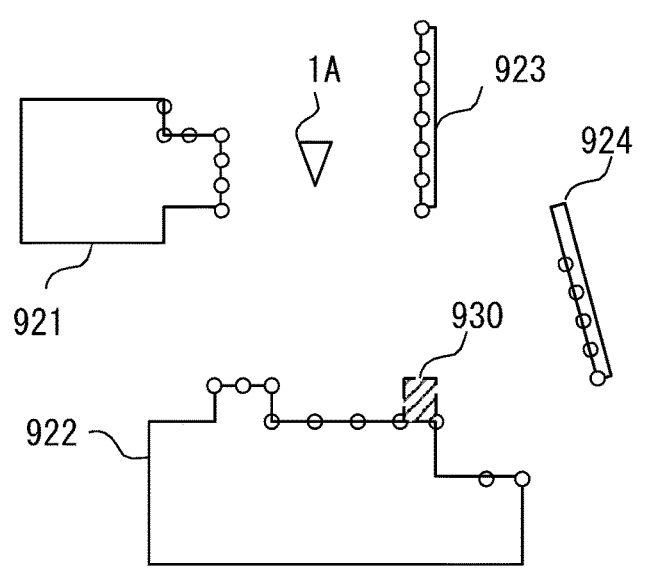
FIG. 16B is a diagram showing a correlation between the parking lot point group and the local peripheral information.

In this premise, when the vehicle 1A traveling into the parking lot 920 from the upper side in FIG. 15 has reached the position shown by a dashed line in FIG. 15 (parking area 930), the on-vehicle processing device 120 obtains the point group data shown in FIG. 16A as the local peripheral information 122B. Then, the correlation between the local peripheral information 122B and the parking lot point group 124A, that is, the coordinate transformation formula for the local coordinate system and the parking lot coordinate system is calculated through the matching process, and thus, the on-vehicle processing device 120 estimates the position of the vehicle 1A in the parking lot coordinate system. FIG. 16B is a diagram in which the local peripheral information 122B shown in FIG. 16A is overlapped on the point group of the parking lot point group 124A using the calculated coordinate transformation formula.

According to the second embodiment described above, the following operation effect is obtained in addition to the operation effect in the first embodiment. That is to say, since the laser radar 106 can acquire the information in a shorter period than the camera, the on-vehicle processing device 120 can estimate the position more frequently.

Modification of Second Embodiment

Although the vehicle 1A includes the laser radar 106 in the second embodiment, the vehicle 1A may include an ultrasonic radar instead of the laser radar 106. The ultrasonic radar can measure the distance to the obstacle similarly to the laser radar 106. The vehicle 1A may include the ultrasonic radar in addition to the laser radar 106.

Third Embodiment

Figure 17:
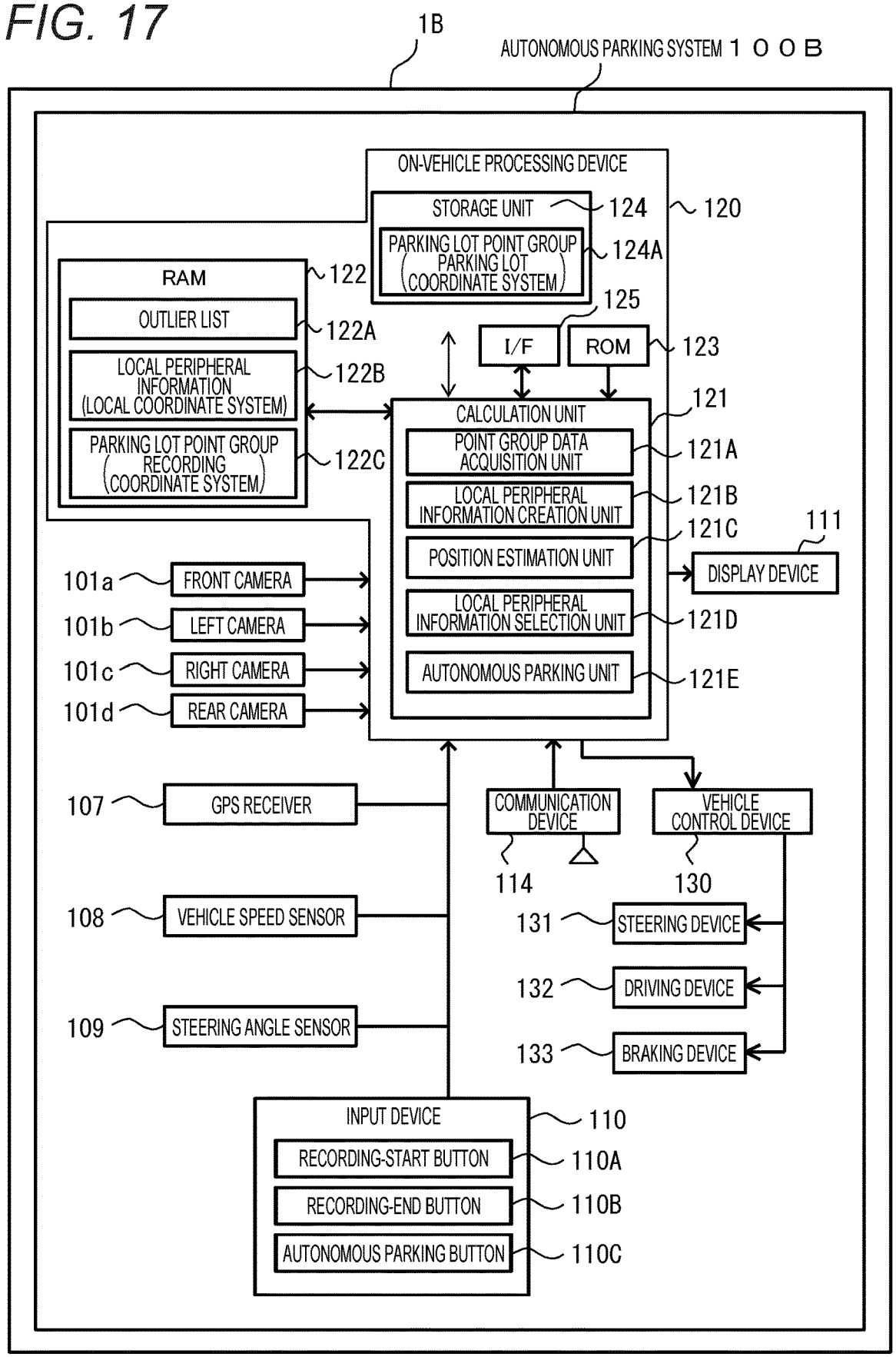
FIG. 17 is a structure diagram illustrating an autonomous parking system including an on-vehicle processing device according to a third embodiment of the present invention.
Figure 18A:
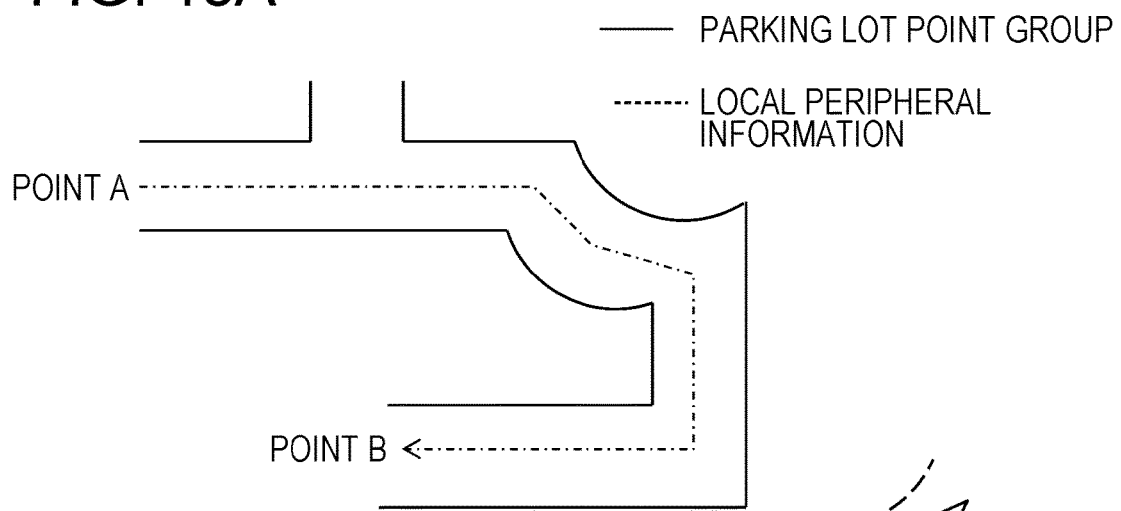
FIGS. 18A to 18C are diagrams showing an operation example in the third embodiment.
Figure 18B:
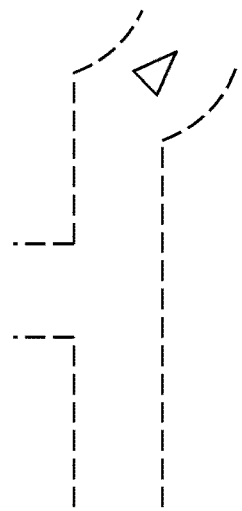
Figure 18C:
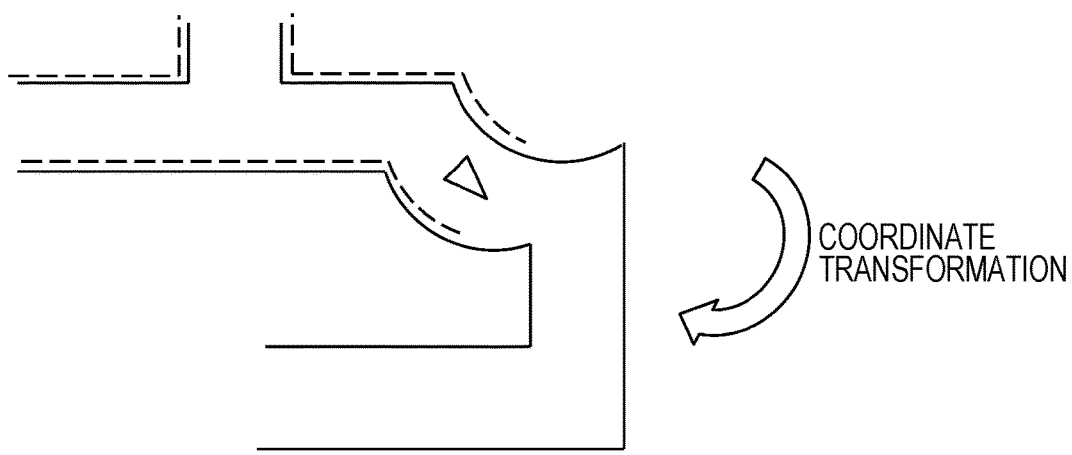

With reference to FIG. 17 to FIG. 18C, an on-vehicle processing device according to a third embodiment of the present invention is described. In the following description, the same component as that of the first embodiment is denoted by the same reference sign, and the different point is described mainly. Regarding the part that is not described, the third embodiment is the same as the first embodiment. The present embodiment is different from the first embodiment in that, mainly, the position is estimated using a bird's eye view image.
(Structure)

FIG. 17 is a structure diagram illustrating an autonomous parking system 100B according to the third embodiment. The autonomous parking system 100B is mounted in a vehicle 1B. The autonomous parking system 100B includes three cameras in addition to the structure of the autonomous parking system 100 in the first embodiment. That is to say, the autonomous parking system 100B includes a front camera 101a that is provided to a front side of the vehicle 1B to photograph an area ahead of the vehicle 1B, a left camera 101b that is provided to a left side of the vehicle 1B to photograph an area on the left side of the vehicle 1B, a right camera 101c that is provided to a right side of the vehicle 1B to photograph an area on the right side of the vehicle 1B, and a rear camera 101d that is provided to a rear side of the vehicle 1B to photograph an area on the rear side of the vehicle 1B. The front camera 101a, the left camera 101b, the right camera 101c, and the rear camera 101d are hereinafter collectively referred to as the camera 101.

The on-vehicle processing device 120 has a structure that is similar to that in the first embodiment. In the present embodiment, the process to be executed by the program stored in the ROM 123 is partially different. In the storage unit 124, sequence bird's eye view images to be described below are stored as the parking lot point group 124A and the local peripheral information 122B. The ROM 123 stores the internal parameters and the external parameters of the camera 101.
(Measurement of Position of Landmark)

In the process of measuring the position of the landmark in the third embodiment, the sequence bird's eye view images to be described below are created.

The on-vehicle processing device 120 creates the bird's eye view image in which the vehicle 1B is viewed from above, by performing a viewpoint conversion process on the photographed image of the camera 101. In this viewpoint conversion process, the internal parameters and the external parameters are used. The on-vehicle processing device 120 creates a first bird's eye view image using a photographed image that is photographed at a first place, and creates a second bird's eye view image using a photographed image that is photographed at a second place. Then, based on a positional relation between the first place and the second place that is calculated from the output of the vehicle speed sensor 108 and the steering angle sensor 109, the on-vehicle processing device 120 synthesizes the first bird's eye view image and the second bird's eye view image. By continuously performing this process as the vehicle 1B moves, the sequence bird's eye view images in which a number of bird's eye view images are synthesized are created.

The first bird's eye view image and the second bird's eye view image may be synthesized in a manner that the bird's eye view image photographed at the latest time is always used priority, or that only the bird's eye view image in a particular direction based on the vehicle 1B, for example only the bird's eye view image just beside the vehicle 1B or in a direction corresponding to 45° to the front may be cut out.
(Operation Example)

FIG. 18A is a diagram showing the travel path of the vehicle 1B and the sequence bird's eye view images created by the on-vehicle processing device 120. In FIGS. 18A to 18C, the vehicle 1B creates the sequence bird's eye view images as traveling along the route expressed by a dash-dot line in the drawing from a place A to a place B. In the case where the sequence bird's eye view images are stored in the storage unit 124 as the parking lot point group 124A, when the on-vehicle processing device 120 performs the operation in the autonomous parking phase, the position in the map coordinate system (parking lot coordinate system) is estimated as below.

The on-vehicle processing device 120 creates the sequence bird's eye view images on the basis of the output from the camera 101, the vehicle speed sensor 108, and the steering angle sensor 109, and saves the images in the RAM 122 as the local peripheral information 122B. The on-vehicle processing device 120 obtains the sequence bird's eye view images that are shown in FIG. 18B, that is, the local peripheral information 122B when the vehicle 1B has traveled to a certain place. By the matching process, the on-vehicle processing device 120 calculates the correlation between the local peripheral information 122B and the parking lot point group 124A, that is, the coordinate transformation formula between the local coordinate system and the parking lot coordinate system. Thus, the position of the vehicle 1A in the parking lot coordinate system is estimated as shown in FIG. 18C.

According to the third embodiment described above, the following operation effect is obtained in addition to the operation effect in the first embodiment. That is to say, since the parking lot point group 124A and the local peripheral information 122B are formed from the photographed images of the camera 101, it is easy for the user to check the position.

First Modification of Third Embodiment

Although the photographed image is subjected to the viewpoint conversion process so that the bird's eye view image is created in the third embodiment, the characteristic point may be extracted from the photographed image and only the extracted characteristic point may be subjected to the viewpoint conversion process so that the bird's eye view image is created. In this case, the sequence bird's eye view images are formed of the characteristic point only.

Note that the present invention is not limited to the embodiment described above and various modifications are included. For example, the above embodiment is intended to describe the present invention in detail and the present invention is not limited to the embodiment that includes all the structures that have been described. A part of a certain embodiment may be replaced by the structure of another embodiment, or the structure of a certain embodiment may be added to the structure of another embodiment. A part of the structure of each embodiment may be added to, deleted from, or replaced by another structure.

The structures, the functions, and the like described above may be partially or entirely achieved by hardware, for example, may be designed by an integrated circuit. Alternatively, the structures, the functions, and the like described above may be achieved by software; for example, the processor (calculation unit 121) construes and executes the programs that achieve those functions. The information such as the programs, tables, and files to achieve the functions may be set in a recording device such as a memory, a hard disk, or an SSD (Solid State Drive), or a recording medium such as an IC card, an SD card, or a DVD.

REFERENCE SIGNS LIST

1, LA, 1B vehicle
100, 100A, 100B autonomous parking system
102 camera
107 GPS receiver
108 vehicle speed sensor
109 steering angle sensor
120 on-vehicle processing device
121 calculation unit
121A point group data acquisition unit
121B local peripheral information creation unit
121C position estimation unit
122A outlier list
122B local peripheral information
124 storage unit
124A parking lot point group
125 interface
130 vehicle control device
IB point group coincidence
IC instantaneous coincidence
IW overall coincidence

The invention claimed is:

1. An on-vehicle processing device, comprising:
a storage unit that stores first point group data including a plurality of coordinates of points of a part of an object in a first coordinate system;
an interface that acquires from a sensor that detects peripheral information expressing an image of the object around a vehicle or a distance to the object, the peripheral information, and that acquires movement information expressing a movement quantity and a movement direction of the vehicle;
a processor programmed to generate local peripheral information expressing second point group data including a position of the vehicle in a second coordinate system and a plurality of coordinates of points of a part of the object in the second coordinate system on the basis of the peripheral information and the movement information, estimate a correlation between the first coordinate system and the second coordinate system on the basis of the first point group data and the local peripheral information, and estimate the position of the vehicle in the first coordinate system from the position of the vehicle in the second coordinate system and the correlation; and
the processor searches the first point group data for a point corresponding to each point of the second point group data expressed by the local peripheral information, and estimates a coordinate transformation formula expressing the correlation between the first coordinate system and the second coordinate system so that a distance between the corresponding points is minimized.

2. The on-vehicle processing device according to claim 1, wherein the processor performs the search and the estimation after excluding point data of the local peripheral information in which the distance between the corresponding points is more than a predetermined threshold, from the second point group data expressed by the local peripheral information.

3. The on-vehicle processing device according to claim 2, wherein:
the first point group data and the second point group data expressed by the local peripheral information are shown as coordinates in a two-dimensional space or coordinates in a three-dimensional space; and
the processor performs the search and the estimation after excluding point data of the point where the distance between the corresponding points is more than a predetermined threshold and which is positioned spatially at an end in the second point group data expressed by the local peripheral information.

4. The on-vehicle processing device according to claim 2, wherein:
the processor calculates a trajectory of the vehicle on the basis of the movement information;
the processor selects the second point group data from the local peripheral information on the basis of a length of the trajectory and a shape of the trajectory; and
the processor matches the first point group data and the second point group data that are selected.

5. The on-vehicle processing device according to claim 1, wherein:
the first point group data include a periodic characteristic; and
the processor, after estimating the coordinate transformation formula for the first coordinate system and the second coordinate system, corrects the coordinate transformation formula for the first coordinate system and the second coordinate system on the basis of a distance for one period of the periodic characteristic so that the distance between the corresponding points becomes shorter.

6. The on-vehicle processing device according to claim 5, wherein the processor performs the correction if an instantaneous coincidence corresponding to an index expressing a coincidence between the first point group data in the first coordinate system and the local peripheral information in the first coordinate system resulting from the transformation, by the coordinate transformation formula, of the local peripheral information that is created based on a previously estimated position of the vehicle in the first coordinate system, the latest peripheral information that is acquired by the interface, and the latest movement information that is acquired by the interface is lower than a predetermined threshold.

7. The on-vehicle processing device according to claim 1, wherein the processor creates third point group data including a plurality of coordinates of points of a part of the object excluding a mobile body in a third coordinate system on the basis of the peripheral information and the movement information, and stores the third point group data in the storage unit.

8. The on-vehicle processing device according to claim 7, wherein:
the third coordinate system is set based on the position and a posture of the vehicle when creation of the third point group data is started; and
when the plurality of pieces of third point group data in which the coordinate systems are different because the position or posture of the vehicle is different when the creation of the third point group data is started are obtained, the processor estimates the correlation of the coordinate systems that are different, on the basis of a parking position of the vehicle, and merges the plurality of pieces of third point group data.

9. The on-vehicle processing device according to claim 1, wherein the processor drives the vehicle on the basis of the first point group data and the position of the vehicle that is estimated by the processor, and moves the vehicle to a parking position that is specified in advance in the first coordinate system; and
wherein the processor acquires from a receiver that receives positional information expressing the position of the vehicle, the positional information, wherein:
the object is a structure in a parking lot;
the storage unit additionally stores positional information of the parking lot; and
the processor moves the vehicle to the parking position if a difference in distance between the position of the vehicle that is expressed by the positional information and the position of the parking lot that is expressed by the positional information of the parking lot stored in the storage unit is shorter than a predetermined distance.

10. The on-vehicle processing device according to claim 1, wherein:
the first coordinate system is set based on the position and the posture of the vehicle when recording of the first point group data is started; and
the second coordinate system is set based on the position and the posture of the vehicle when recording of the local peripheral information is started.

* * * * *